(12) United States Patent
Hwang et al.

(10) Patent No.: US 11,714,520 B2
(45) Date of Patent: Aug. 1, 2023

(54) METHOD AND APPARATUS FOR PROVIDING MULTI-WINDOW IN TOUCH DEVICE

(71) Applicant: Samsung Electronics Co., Ltd., Suwon-si (KR)

(72) Inventors: Daesik Hwang, Suseong-gu (KR); Hyesoon Jeong, Chilgok-gun (KR); Jeonghoon Kim, Gumi-si (KR); Dongjun Lee, Gumi-si (KR); Jonghwa Oh, Dalseo-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 17/030,645

(22) Filed: Sep. 24, 2020

(65) Prior Publication Data

US 2021/0011610 A1 Jan. 14, 2021

Related U.S. Application Data

(63) Continuation of application No. 14/035,266, filed on Sep. 24, 2013, now abandoned.

(30) Foreign Application Priority Data

Sep. 24, 2012 (KR) .................. 10-2012-0105898

(51) Int. Cl.
*G06F 3/048* (2013.01)
*G06F 3/04817* (2022.01)
(Continued)

(52) U.S. Cl.
CPC ........ *G06F 3/04817* (2013.01); *G06F 3/0481* (2013.01); *G06F 3/0486* (2013.01);
(Continued)

(58) Field of Classification Search
CPC .. G06F 3/04817; G06F 3/0481; G06F 3/0486; G06F 3/0488; G06F 3/04886; G06F 2203/04803; G06F 3/048
See application file for complete search history.

(56) References Cited

U.S. PATENT DOCUMENTS

| | | | |
|---|---|---|---|
| 5,169,342 | A | 12/1992 | Steele et al. |
| 5,390,295 | A | 2/1995 | Bates et al. |

(Continued)

FOREIGN PATENT DOCUMENTS

| | | | |
|---|---|---|---|
| CN | 101676853 | A | 3/2010 |
| CN | 102129345 | A | 7/2011 |

(Continued)

OTHER PUBLICATIONS

European Search Report dated May 8, 2019, issued in European Application No. 18214482.4-1224/3493042.
(Continued)

*Primary Examiner* — Steven B Theriault
(74) *Attorney, Agent, or Firm* — Jefferson IP Law, LLP

(57) ABSTRACT

A method of executing an application in a touch device is provided. The method includes displaying an execution screen of a first application as a full screen, receiving an input of an execution event for executing a second application, configuring a multi-window in a split scheme when the execution event is released on a specific window, and independently displaying screens of the first application and the second application through respective split windows.

22 Claims, 36 Drawing Sheets

(51) Int. Cl.
  *G06F 3/0481* (2022.01)
  *G06F 3/0486* (2013.01)
  *G06F 3/04886* (2022.01)
  *G06F 3/0488* (2022.01)

(52) U.S. Cl.
  CPC ........ *G06F 3/0488* (2013.01); *G06F 3/04886* (2013.01); *G06F 2203/04803* (2013.01)

(56) References Cited

U.S. PATENT DOCUMENTS

| | | |
|---|---|---|
| 5,714,971 A | 2/1998 | Shalit |
| 5,819,055 A | 10/1998 | Maclean et al. |
| 6,008,809 A | 12/1999 | Brooks |
| 6,166,736 A | 12/2000 | Hugh |
| 6,310,631 B1 | 10/2001 | Cecco et al. |
| 7,269,797 B1 | 9/2007 | Bertocci et al. |
| 7,362,341 B2 | 4/2008 | McGuire et al. |
| 7,705,833 B2* | 4/2010 | Kim ............... H04M 1/72469 715/779 |
| 8,434,019 B2 | 4/2013 | Nelson |
| 8,627,229 B2 | 1/2014 | Iizuka |
| 8,704,778 B2 | 4/2014 | Miyashita et al. |
| 8,713,473 B2 | 4/2014 | Shah et al. |
| 8,907,904 B2 | 12/2014 | Sirpal et al. |
| 8,907,977 B2 | 12/2014 | Roth et al. |
| 8,930,847 B2 | 1/2015 | Jeong |
| 8,952,904 B2 | 2/2015 | Miura et al. |
| 9,032,292 B2 | 5/2015 | Lavallee |
| 9,140,290 B2* | 9/2015 | Damm ............... F16B 37/046 |
| 9,154,606 B2 | 10/2015 | Tseng et al. |
| 9,158,445 B2 | 10/2015 | Wong et al. |
| 9,256,303 B2 | 2/2016 | Wang et al. |
| 9,256,356 B2* | 2/2016 | Nojima ............... G06F 3/0486 |
| 9,330,099 B2 | 5/2016 | Sung et al. |
| 9,363,359 B2 | 6/2016 | Mhun et al. |
| 9,898,155 B2 | 2/2018 | Kim et al. |
| 9,933,922 B2 | 4/2018 | Ye |
| 9,973,612 B2 | 5/2018 | Son et al. |
| 10,101,898 B2 | 10/2018 | Ameline |
| 10,254,942 B2 | 4/2019 | Vranjes et al. |
| 10,387,009 B2 | 9/2019 | Sung et al. |
| 10,564,836 B2 | 2/2020 | Belisle et al. |
| 10,620,794 B2 | 4/2020 | Cotterill et al. |
| 2001/0028365 A1 | 10/2001 | Ludolph |
| 2002/0165993 A1 | 11/2002 | Kramer |
| 2002/0191028 A1 | 12/2002 | Senechalle et al. |
| 2003/0076362 A1* | 4/2003 | Terada ............... G06F 3/0486 715/781 |
| 2003/0090521 A1 | 5/2003 | Hansen et al. |
| 2003/0160815 A1 | 8/2003 | Muschetto |
| 2004/0051780 A1 | 3/2004 | Sudo |
| 2004/0095397 A1 | 5/2004 | Nojima et al. |
| 2004/0119750 A1 | 6/2004 | Harrison |
| 2004/0239684 A1* | 12/2004 | McGuire ............... G06F 3/0481 345/619 |
| 2005/0235220 A1 | 10/2005 | Duperrouzel et al. |
| 2006/0020903 A1 | 1/2006 | Wang et al. |
| 2006/0224992 A1 | 10/2006 | Rossi et al. |
| 2006/0238517 A1 | 10/2006 | King et al. |
| 2007/0097092 A1 | 5/2007 | Jung et al. |
| 2007/0120832 A1 | 5/2007 | Saarinen et al. |
| 2007/0192726 A1* | 8/2007 | Kim ............... G09G 5/14 715/781 |
| 2007/0250788 A1 | 10/2007 | Rigolet |
| 2007/0252822 A1* | 11/2007 | Kim ............... G06F 3/04817 345/173 |
| 2008/0024666 A1 | 1/2008 | Sudo et al. |
| 2008/0158189 A1 | 7/2008 | Kim |
| 2009/0013282 A1 | 1/2009 | Mercer |
| 2009/0064035 A1 | 3/2009 | Shibata et al. |
| 2009/0144661 A1 | 6/2009 | Nakajima et al. |
| 2009/0150823 A1* | 6/2009 | Orr ............... G06F 3/0481 715/788 |
| 2009/0199127 A1* | 8/2009 | Sareen ............... G06F 3/04886 715/781 |
| 2009/0228820 A1 | 9/2009 | Kim et al. |
| 2009/0249235 A1 | 10/2009 | Kim et al. |
| 2009/0288036 A1 | 11/2009 | Osawa et al. |
| 2010/0013780 A1 | 1/2010 | Ikeda et al. |
| 2010/0066698 A1* | 3/2010 | Seo ............... G06F 9/4843 715/761 |
| 2010/0079392 A1 | 4/2010 | Chiang et al. |
| 2010/0081475 A1 | 4/2010 | Chiang et al. |
| 2010/0083154 A1 | 4/2010 | Takeshita |
| 2010/0088597 A1 | 4/2010 | Shin et al. |
| 2010/0088634 A1* | 4/2010 | Tsuruta ............... G06F 3/0481 715/788 |
| 2010/0122195 A1 | 5/2010 | Hwang |
| 2010/0131880 A1 | 5/2010 | Lee et al. |
| 2010/0157155 A1 | 6/2010 | Katsushima |
| 2010/0248788 A1* | 9/2010 | Yook ............... G06F 3/04886 455/566 |
| 2010/0257059 A1 | 10/2010 | Fujioka et al. |
| 2010/0259494 A1 | 10/2010 | Kii |
| 2010/0293501 A1 | 11/2010 | Russ et al. |
| 2010/0295802 A1 | 11/2010 | Lee |
| 2010/0313165 A1 | 12/2010 | Louch et al. |
| 2011/0018821 A1 | 1/2011 | Kii |
| 2011/0072344 A1 | 3/2011 | Harris et al. |
| 2011/0074717 A1 | 3/2011 | Yamashita |
| 2011/0099512 A1* | 4/2011 | Jeong ............... G06F 3/04886 715/790 |
| 2011/0119611 A1 | 5/2011 | Ahn et al. |
| 2011/0138276 A1 | 6/2011 | Solomon et al. |
| 2011/0164048 A1 | 7/2011 | Murakami et al. |
| 2011/0175930 A1* | 7/2011 | Hwang ............... G06F 3/0481 345/660 |
| 2011/0202868 A1 | 8/2011 | Yang et al. |
| 2011/0209093 A1 | 8/2011 | Hinckley et al. |
| 2011/0225539 A1 | 9/2011 | Lee et al. |
| 2011/0244924 A1 | 10/2011 | Jung et al. |
| 2012/0005602 A1 | 1/2012 | Anttila et al. |
| 2012/0017178 A1 | 1/2012 | Mulloy |
| 2012/0023453 A1 | 1/2012 | Wagner |
| 2012/0047460 A1 | 2/2012 | McCann |
| 2012/0066630 A1 | 3/2012 | Kim et al. |
| 2012/0069049 A1 | 3/2012 | Howe et al. |
| 2012/0102437 A1 | 4/2012 | Worley et al. |
| 2012/0131483 A1 | 5/2012 | Archer et al. |
| 2012/0131497 A1* | 5/2012 | Jitkoff ............... G06F 3/04883 715/786 |
| 2012/0144331 A1 | 6/2012 | Tolonen et al. |
| 2012/0154303 A1 | 6/2012 | Lazaridis et al. |
| 2012/0169768 A1* | 7/2012 | Roth ............... G06F 3/0486 345/629 |
| 2012/0176322 A1* | 7/2012 | Karmi ............... G06F 3/04883 345/173 |
| 2012/0208593 A1* | 8/2012 | Yang ............... G06F 3/0481 715/252 |
| 2012/0218202 A1 | 8/2012 | Sirpal et al. |
| 2012/0235930 A1 | 9/2012 | Lazaridis et al. |
| 2012/0236037 A1 | 9/2012 | Lessing et al. |
| 2012/0272128 A1 | 10/2012 | Takaku et al. |
| 2012/0289290 A1 | 11/2012 | Chae et al. |
| 2012/0290966 A1 | 11/2012 | Chae et al. |
| 2012/0304111 A1 | 11/2012 | Queru |
| 2012/0306782 A1 | 12/2012 | Seo et al. |
| 2012/0317499 A1 | 12/2012 | Shen |
| 2012/0327106 A1 | 12/2012 | Won et al. |
| 2013/0033477 A1 | 2/2013 | Sirpal et al. |
| 2013/0057587 A1 | 3/2013 | Leonard et al. |
| 2013/0067389 A1 | 3/2013 | Jin |
| 2013/0076594 A1 | 3/2013 | Sirpal et al. |
| 2013/0076793 A1 | 3/2013 | Sirpal et al. |
| 2013/0086508 A1 | 4/2013 | Oguz |
| 2013/0117689 A1 | 5/2013 | Lessing et al. |
| 2013/0125045 A1 | 5/2013 | Sun et al. |
| 2013/0141371 A1 | 6/2013 | Hallford et al. |
| 2013/0145295 A1 | 6/2013 | Booking et al. |
| 2013/0159941 A1 | 6/2013 | Langlois et al. |
| 2013/0187869 A1 | 7/2013 | Rydenhag et al. |

(56) References Cited

U.S. PATENT DOCUMENTS

| | | |
|---|---|---|
| 2013/0191791 A1 | 7/2013 | Rydenhag et al. |
| 2013/0227413 A1 | 8/2013 | Thorsander et al. |
| 2013/0227419 A1 | 8/2013 | Lee et al. |
| 2013/0227470 A1 | 8/2013 | Thorsander et al. |
| 2013/0227482 A1 | 8/2013 | Thorsander et al. |
| 2013/0227483 A1 | 8/2013 | Thorsander et al. |
| 2013/0227490 A1 | 8/2013 | Thorsander et al. |
| 2014/0053097 A1 | 2/2014 | Shin et al. |
| 2014/0068504 A1 | 3/2014 | Sun et al. |
| 2014/0157163 A1 | 6/2014 | Strutin-Belinoff et al. |
| 2014/0164991 A1 | 6/2014 | Kim et al. |
| 2014/0282214 A1 | 9/2014 | Shirzadi et al. |
| 2014/0304651 A1 | 10/2014 | Johansson et al. |
| 2014/0325428 A1* | 10/2014 | Lee .................. G06F 3/0488 715/781 |
| 2016/0046188 A1 | 2/2016 | Wild et al. |

FOREIGN PATENT DOCUMENTS

| | | |
|---|---|---|
| CN | 102520839 A | 6/2012 |
| EP | 2166437 A2 | 3/2010 |
| EP | 2 330 383 A1 | 6/2011 |
| EP | 2 595 042 A2 | 5/2013 |
| EP | 2 976 699 A1 | 1/2016 |
| KR | 10-0595029 B1 | 6/2006 |
| KR | 10-2010-0048297 A | 5/2010 |
| KR | 10-2011-0082494 A | 7/2011 |
| KR | 10-2012-0059909 A | 6/2012 |
| WO | 2010/110613 A1 | 9/2010 |
| WO | 2013/073906 A1 | 5/2013 |

OTHER PUBLICATIONS

Indian Office Action dated Jan. 21, 2020, issued in Indian Application No. 575/MUMNP/2015.
Chinese Office Action dated Feb. 3, 2020, issued in Chinese Application No. 201310439519.5.
Korean Intellectual Property Office Action dated Jul. 11, 2018, issued in the Korean Application No. 10-2012-0105898.
IEEE Dictionary of Standards Terms, 7th ed (2000), entry for "window", 1 page. (Year: 2000).
"Window Concept" Internet article published at https://www.lib.uom.gr/accelerate/ttu_en/gui_windows.html on or before May 4, 2012 per Internet Archive Wayback Machine capture; 6 pages. (Year: 2012).
"What is a Window?" Internet article published at https://msdn.microsoft.com/en-us/library/windows/desktop/ff381403(v=vs.85).aspx on or before Jul. 12, 2012 per Internet Archive Wayback Machine capture; 5 pages. (Year: 2012).

* cited by examiner

METHOD AND APPARATUS FOR PROVIDING MULTI-WINDOW IN TOUCH DEVICE

CROSS-REFERENCE TO RELATED APPLICATION(S)

This application is a continuation application of prior application Ser. No. 14/035,266, filed on Sep. 24, 2013, which claims the benefit under 35 U.S.C. § 119(a) of a Korean patent application filed on Sep. 24, 2012 in the Korean Intellectual Property Office and assigned Serial No. 10-2012-0105898, the entire disclosure of which is hereby incorporated by reference.

TECHNICAL FIELD

The present disclosure relates to a method and an apparatus for operating a function in a touch device. More particularly, the present disclosure relates to a method of providing a multi-window in a touch device so that a plurality of application may be efficiently used through multi-splitting of a window on one screen provided from the touch device, and an apparatus thereof.

BACKGROUND

In recent years, with the development of digital technology, various mobile devices such as a mobile communication terminal, a Personal Digital Assistant (PDA), an electronic note device, a smart phone, a tablet Personal Computer (PC), and the like, each capable of processing communication and personal information while a user is moving, have been introduced. These mobile devices have developed to a mobile convergence stage including the traditional field of communication and other terminal fields. The mobile device may have various functions, such as the ability to process an audio call, an image call, to process the transmission and reception of a message such as a Short Message Service (SMS)/Multimedia Message Service (MIMS), an e-mail, an electronic note, photography, a broadcasting play, a video play, a music play, information from Internet, a messenger, and a Social Networking Service (SNS).

However, in the touch device, due to a characteristic of the touch device having a small screen, only one application view can be provided at once. Any additional application is displayed through pop-up. Accordingly, in the related art, due to a screen having a small size, although a plurality of applications are simultaneously executed, only one application view is provided to a current screen according to the user selection. That is, the related art cannot efficiently use a plurality of applications.

Therefore, a need exists for a method and apparatus in which a plurality of applications may be efficiently used by splitting a window displayed on one screen of the touch device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of implementing a multi-window environment in a single system of a touch device composed of at least two split windows and an apparatus thereof.

Another aspect of the present disclosure is to provide a method of providing a multi-window in a touch device capable of maximizing the usability of the touch device by a user by splitting one screen into at least two windows to easily arrange and execute a plurality of applications and an apparatus thereof.

Another aspect of the present disclosure is to provide a method of supporting a multi-widow environment in a touch device capable of simply changing a layout for convenience of an operation of a plurality of applications in the multi-window environment and supporting the convenience of a user operation in the multi-window environment and an apparatus thereof.

Another aspect of the present disclosure is to provide a method of supporting a multi-window in a touch device capable of minimizing a burden of a user operation in a multi-window environment, and increases the user's convenience with respect to a plurality of applications by freely adjusting windows with respect to a plurality of applications and an apparatus thereof.

Another aspect of the present disclosure is to provide a method of supporting a multi-window environment in a touch device capable of supporting large amounts of information and various experiences to the user by implementing a multi-window environment in a touch device and an apparatus thereof.

Another aspect of the present disclosure is to provide a method of supporting a multi-window environment capable of improving convenience for a user and usability of the touch device by implementing an optimal environment for supporting a multi-window environment in a touch device is provided.

In accordance with an aspect of the present disclosure, a method of executing an application in a touch device is provided, The method includes displaying an execution screen of a first application as a full screen, receiving an input of an execution event for executing a second application, configuring a multi-window in a split scheme when the execution event is released on a specific window, and individually displaying screens of the first application and the second application through respective split windows.

In accordance with another aspect of the present disclosure, a method of executing an application in a touch device is provided. The method includes executing a first application corresponding to a user selection and displaying the application through one window as a full screen, receiving a first event input for selecting and moving a second application when the first application is executed, determining a multi-window split scheme and a region to which a first event is input, outputting a feedback for a window in which the second application is able to be executed and the region to which the first event is input, receiving a second event input for executing the second application, configuring the multi-window in response to the second event input, and independently displaying a screen of the first application and a screen of the second application through corresponding windows separated by the multi-window.

In accordance with another aspect of the present disclosure, a method of executing an application in a touch device is provided. The method includes displaying an execution screen of a first application as a full screen, sliding-in a tray including an execution icon of an application according to a user input when the first application is executed, receiving an input for selecting an execution icon of a second application from the tray and dragging the selected execution icon into the full screen, receiving an input for dropping the execution icon in a specific window while the execution icon is dragged, executing the second application in response to the drop input of the execution icon, splitting a full screen into windows for displaying screens of the first application and the second application, and displaying a screen of the second application through the specific window in which the execution icon is dropped and displaying the screen of the first application through another split window.

In order to achieve the above objects, there is provided a computer readable recording medium recording a program for executing the methods in a processor.

In accordance with another aspect of the present disclosure, a touch device is provided, The touch device includes a touch screen configured to display a screen interface of a multi-window environment, to display screens of a plurality of applications through a plurality of windows split in the screen interface, and to receive an event input for operating the applications, and a controller configured to control execution of the applications in the multi-window environment, and to control to independently display screens of at least two applications through the windows according to a user selection from among a plurality of executed applications.

In accordance with another aspect of the present disclosure, a computer readable recording medium having recorded thereon a program performing a method is provided. The method includes receiving an input of an execution event for executing a second application when an execution screen of a first application is displayed as a full screen, configuring a multi-window in a split scheme when the execution event is released on a specific window, and individually displaying screens of the first application and the second application through respective split windows.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the cope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method of providing a multi-window in a touch device which splits a screen of the touch device into at least two windows in a split scheme to provide a multi-window and allows a user to efficiently use a plurality of applications through the multi-window on one screen and an apparatus thereof.

Embodiments of the present disclosure may include selecting an additional application in a touch device to determine a screen split scheme upon execution of a drag, and may feedback a corresponding window in which an additional application is able to be executed from among respective windows split from one screen. Accordingly, the user may know where an additional application being executed exists. Further, according to an embodiment of the present disclosure, when the additional application is executed at a location selected by the user, a screen of the application may be displayed suitable for the size of a corresponding window.

Hereinafter, a configuration of a touch device and a method of controlling an operation thereof according to embodiments of the present disclosure will be described with reference to the accompanying drawings. A configuration of the touch device and a method of controlling an operation thereof according to embodiments of the present disclosure are not limited to the following description, but are also applicable to various additional embodiments based on the embodiments described herein.

Figure 1:
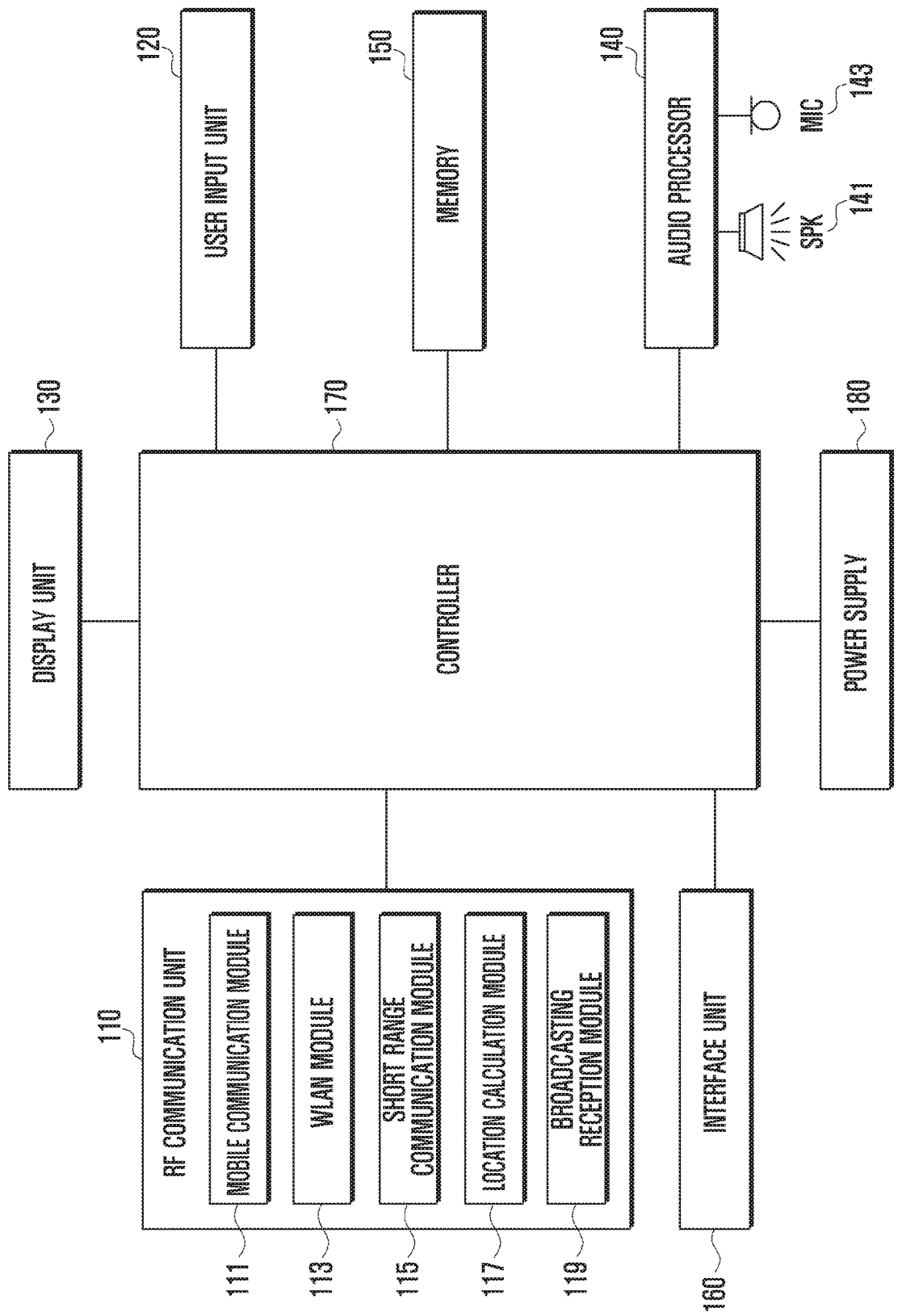
FIG. 1 is a block diagram schematically illustrating a configuration of a touch device according to an embodiment of the present disclosure.

FIG. 1 is a block diagram schematically illustrating a configuration of a touch device according to an embodiment of the present disclosure.

Referring to FIG. 1, the touch device of the present disclosure may include a Radio Frequency (RF) communication unit 110, a user input unit 120, a display unit 130, an audio processor 140, a memory 150, an interface unit 160, a controller 170, and a power supply 180. Since constituent elements shown in FIG. 1 may not be essential, a touch device of the present disclosure may be implemented with more than the above described elements or less than the above described elements.

The RF communication unit 110 may include at least one or more modules capable of performing a wireless communication between the touch device and a wireless communication system or between the touch device and a network in which another device is located. For example, the wireless communication unit 110 may include a mobile communication module 111, a Wireless Local Area Network (WLAN) module 113, a short range communication module 115, a location calculation module 117, and a broadcasting reception module 119.

The mobile communication module 111 transmits and receives a wireless signal to and from at least one of a base station, an external terminal, various servers (e.g., an integration server, a provider server, a content server, or the like). The wireless signal may include a voice call signal, an image call signal, or data of various formats according to the transmission/reception of a character/multi-media message. The mobile communication module 111 may access at least one of various servers under control of the controller 170 to receive an application available in a touch device according to user selection.

The WLAN module 113 may be a module for access to wireless Internet, and forming a wireless LAN link with other touch device, and may be installed at an inside or outside of the touch device. Wireless Internet techniques may include Wireless LAN/Wi-Fi (WLAN), Wireless broadband (Wibro), World Interoperability for Microwave Access (Wimax), and High Speed Downlink Packet Access (HSDPA). The WLAN module 113 may access at least one of various servers to receive a usable application from the touch device according to user selection under control of controller 170. Further, when a WLAN link is formed with another touch device, the WLAN module 113 may transmit or receive an application according to the user selection to or from another touch device.

The short range communication module 115 is a module for short range communication. The short range communication techniques may include Bluetooth, Bluetooth Low Energy (BLE), Radio Frequency IDentification (RFID), Infrared Data Association (IrDA), Ultra Wideband (UWB), ZigBee, and Near Field Communication (NFC). When the short range communication module 115 connects short range communication with another touch device, the short range communication module 115 may transmit or receive an application according to the user selection to or from another touch device.

The location calculation module 117 is a module for acquiring a location of the touch device. For example, the location calculation module 117 includes a Global Position System (GPS). The location calculation module 115 may calculate distance information distant from at least three base stations and exact time information, apply trigonometry to the calculated information so that three-dimensional current location information according to latitude, longitude, and altitude may be calculated. The location calculation module 115 may continuously receive a current location of the touch device from at least three satellites in real time to calculate location information. The location information of the touch device may be acquired by various schemes.

The broadcasting receiving module 119 receives a broadcasting signal (e.g., a TV broadcasting signal, a radio broadcasting signal, a data broadcasting signal) and/or information (e.g., a broadcasting channel, a broadcasting program or information about a broadcasting service provider) from an external broadcasting management server through a broadcasting channel (e.g., a satellite channel or a terrestrial channel).

The user input unit 120 generates input data for controlling an operation of the touch device by user. The user input unit 120 may be configured by a key pad, a dome switch, a touch pad (e.g., a resistive/capacitive type), a jog wheel, and a jog switch. The user input unit 120 may be implemented in the form of a button outside the touch device, and some buttons may be implemented by a touch panel.

The display unit 130 displays (i.e., outputs) information processed by the touch device. For example, when the touch device is in a call mode, the display unit 130 displays User Interface (UI) or Graphical UI (GUI) associated with a call. When the touch device is in an image call mode or a shooting mode, the display unit 130 displays photographed and/or received image or UI and GUI.

Figure 3:
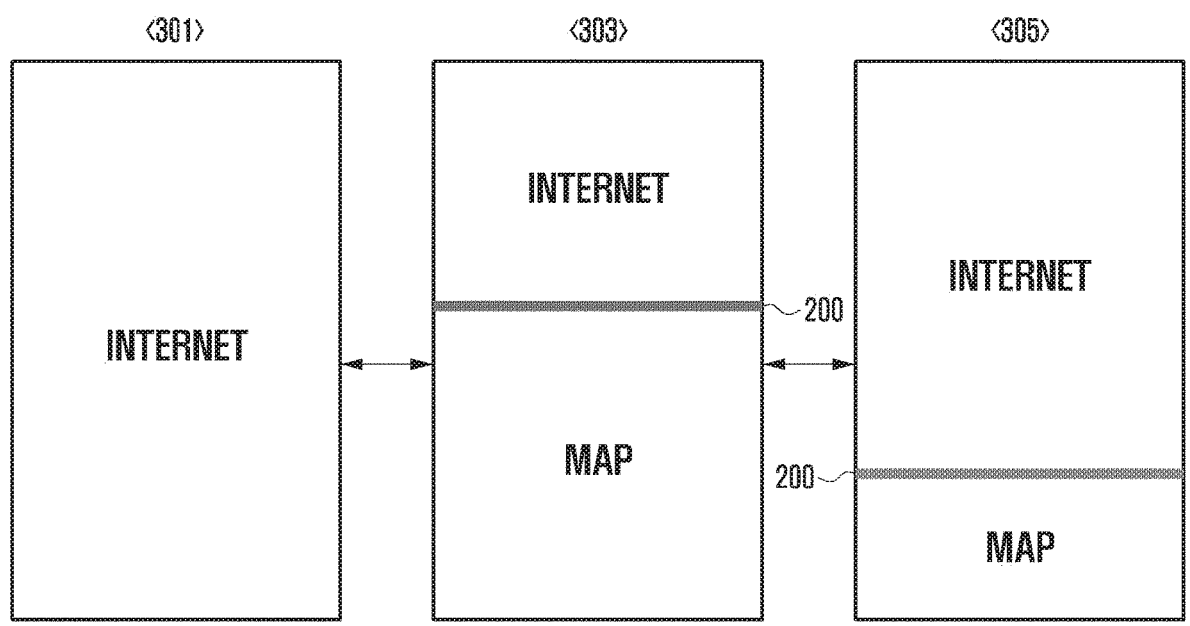
FIG. 3 is a diagram schematically illustrating an operation of a multi-window in a touch device according to an embodiment of the present disclosure.

In the present disclosure, the display unit 130 may display an execution screen with respect to various functions (or applications) executed in the touch device through one or more windows, as will be illustrated in relation to the following figures, for instance FIG. 3. The execution screen may therefore display data relating to multiple applications. In particular, the display unit 130 may provide at least two split screen regions according to a split scheme, and may provide the split screen regions to one window, respectively to form a multi-window. That is, the display unit 130 may display a screen corresponding to the multi-window environment, and may display an execution screen with respect to a plurality of applications through a multi-window, which is split regions. In this case, the display unit 130 may simultaneously display a screen of one window and a screen of another window in parallel. The display unit 130 may display a separator for separating respective windows, that is, split regions. The display unit 130 may display a tray (or an application launcher) for efficiently and intuitively executing an application according to the multi-window environment. The tray comprises a screen region in which, for instance, icons representing respective applications may be displayed and selected. The tray may comprise a pop-up object displayed upon the screen. The tray may be moved within the screen. The display unit 130 may display a virtual input device (e.g., a touch key pad or a floating key pad which is freely moved in a full screen region. Further, the display unit 130 may receive a user input on a full screen (the whole of the available screen area of the display unit 130) or on an individual window screen provided through one or more windows in a multi-window environment, and may transfer an input signal according to the user input to the controller 170. Further, the display unit 130 may support screen display in a landscape mode, screen display in a vertical mode (portrait mode), and a screen switch display according to variation between the landscape mode and the vertical mode according to the orientation or a change in the orientation of the touch device. An embodiment of a screen of the display unit 130 operated according to an embodiment of the present disclosure will be described herein.

The display unit 130 may include at least one of a Liquid Crystal Display (LCD), a Thin Film Transistor-Liquid Crystal Display (TFT LCD), a Light Emitting Diode (LED), an Organic Light-Emitting Diode (OLED), an Active Matrix OLED (AMOLED), a flexible display, a bendable display 100, and a 3D display. Some of the above displays may be implemented by a transparent display configured in a transparent type or a light transmittance type to look out the outside there through.

When a touch panel detecting a touch operation forms a layer structure with the display unit 130 (e.g., a "touch screen"), the display unit 130 may be used as an input device as well as an output device. The touch panel may convert pressure applied to a specific part of the display unit 130 or a variation in capacitance created at the specific part of the display unit 130 into an electric input signal. The touch panel may detect a touched location, an area, or pressure upon touch. When there is touch input with respect to the touch panel, a signal(s) corresponding to the touch input is sent to a touch controller (not shown). The touch controller (not shown) processes the signal(s) and transmits corresponding data to the controller 170. Accordingly, the controller 170 may recognize which region of the display unit 330 is touched.

The audio processor 140 transmits an audio signal input from the controller 170 to a speaker 141, and transfers an audio signal such as a voice input from the microphone 143 to the controller 170. The audio processor 140 converts voice/sound data into an audible sound and outputs the audible sound through the speaker 141 under the control of the controller 170. The audio processor 140 may convert an audio signal such as a voice input from the microphone 143 into a digital signal, and may transfer the digital signal to the controller 170.

The speaker 141 may output audio data received from the RF communication unit 110 or stored in the memory 150 in a call mode, a record mode, a media contents play mode, a photographing mode, or a multimedia mode. The speaker 141 may output a sound signal associated with a function (e.g., a receiving call connection, a sending call connection, a music file play, a video file play, an external output, or the like) performed in the touch device.

The microphone 143 may receive and process an external sound signal to electric voice data in a call mode, a record mode, a voice recognition mode, or a photographing mode. The processed voice data are converted into a transmissible format and the converted data are outputted to a mobile communication base station through a mobile communication module 111. Various noise removal algorithms for removing a noise generated during a procedure of receiving an external sound signal may be implemented in the microphone 143.

The memory 150 may store a program for process and control of the controller 170, and may temporarily store a function for input/output data (e.g., a telephone number, a message, audio, media contents [e.g., a music file or a video file], or an application). The memory 150 may store a use frequency (e.g., frequencies in the use of an application, frequencies in media contents, or frequencies in a phone number, a message, and in multi-media), an importance, a priority, or a preference according to a function operation of the touch device. The memory 150 may store data regarding a vibration or a sound of various patterns output upon touch input on the touch screen. In particular, the memory 150 may store split information with respect to a screen split scheme for operating a multi-window, application information to be registered in the tray, or application information executed by multi-tasking by the multi-window.

The memory 150 may include a storage medium having at least one of memory types including a flash memory type, a hard disk type, a micro type, a card type (e.g., an SD card or XD card memory), Random Access Memory (RAM), Static Random Access Memory (SRAM), Read-Only Memory (ROM), Programmable Read-Only Memory (PROM), Electrically Erasable Programmable Read-Only Memory (EEPROM), Magnetic RAM (MRAM), a magnetic disc, or an optical disc. The touch device may operate associated with a web storage executing a storage function of the memory 150 on Internet.

The interface unit 160 performs a function of passage with all external devices connected to the touch device. The interface unit 160 may receive data or power from an external device, transfer the data or power to each element inside of the touch device, or transmit data of the inside of touch device to an external device. For example, the interface unit 160 may include a wire/wireless headset port, an external charger port, a wire/wireless data port, a memory card port, a port of connecting a device having an identity module, an audio I/O (input/output) port, a video I/O (input/output) port and an earphone port. The interface unit 160 includes an interface for connecting with an external device in a wired or wireless scheme.

The controller 170 controls an overall operation of the touch device. For example, the controller 170 performs control associated with an operation of an application according to a voice call, a data communication, an image call, or operating a multi-window environment. The controller 170 may include a separate multi-media module (not shown) for operating a multi-window function. According to certain embodiments of the present disclosure, the multi-media module (not shown) may be implemented in the controller 170 and may be implemented separately from the controller 170.

More particularly, the controller 170 may control a series of operations for supporting a multi-window function according to embodiments of the present disclosure. For example, the controller 170 may control execution of a plurality of applications in a multi-window environment. The controller 170 may control to independent display of screens relating to at least two applications according to user selection from among a plurality of executed applications through the plurality of windows.

For example, the controller 170 may receive an execution event input, for instance a touch input, for executing a second application in a state in which an execution screen of the first application is displayed as a full screen (that is, occupying all or substantially all of the available screen area within the display unit 130). The controller 170 may control a feedback output (for instance, visual feedback) with respect to a window where a dragged icon relating to the second application is currently located, or another movement location before the execution event is released. If the execution event is released when located over a specific window, the controller 170 may configure a multi-window according to a pre-set split scheme, and may control to independently display a screen of the first application and the second application through respective split windows.

Further, when an input requesting execution of an additional application is received while displaying screens of a plurality of applications through multi-windows, the controller 170 may control execution of the additional application through a window selected to execute the additional application. In this case, the controller 170 executes, and processes an application previously executed through the selected window in the background (that is, without continuing to display the executing application), and controls to display the additional application screen through the selected window.

Further, the controller 170 may control the display of a tray, a separator, or a floating key pad provided from a screen interface according to the multi-window environment. The controller 170 may allow the displayed tray, separator or floating key pad to be moved within the screen according to a user input or otherwise. More particularly, the controller 170 may determine (i.e., change) the size of each window according to the multi-window environment in accordance with the movement of the separator.

A detailed control operation of the controller 370 will be described in an example of an operation of the touch device and a control method thereof referring to following drawings.

The power supply 180 uses power which is applied from an external power source or an internal power source thereto, and supplies power necessary to operate each constituent element under control of the controller 170.

Various embodiments according to the present disclosure may be implemented in a recording medium which may be read by a computer or a similar device using software, hardware or a combination thereof. According to hardware implementation, various embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and an electric unit for executing the functions. In some cases, embodiments of this disclosure may be implemented by the controller 170. According to the software implementation, various embodiments of procedures and functions according to this specification may be implemented by separate software modules. The software modules may perform one or more functions and operations described in the specification.

The recording medium may include a computer readable recording medium recording a program processing to receive an input of an execution event for executing a second application in a state in which an execution screen of the first application is displayed on a full screen, to output feedback with respect to a window of a moved location when the execution event is moved while not being released, to configure a multi-window according to a preset split scheme when the execution event is released from the moved specific window, or to independently display screen of the first and second applications through respective split windows.

Further, the touch device of the present disclosure illustrated in FIG. 1 may include various information communication devices, multi-media devices supporting a function of the present disclosure, and an application device thereof, such as various devices using an Application Processor (AP), a Graphic Processing Unit (GPU), and a Central Processing Unit (CPU). For example, the touch device includes devices such as a tablet Personal Computer (PC), a Smart Phone, a digital camera, a Portable Multimedia Player (PMP), a media player, a portable game terminal, a Personal Digital Assistant (PDA) as well as mobile communication terminals operating based on respective communication protocols corresponding to various communication systems.

Figure 2:
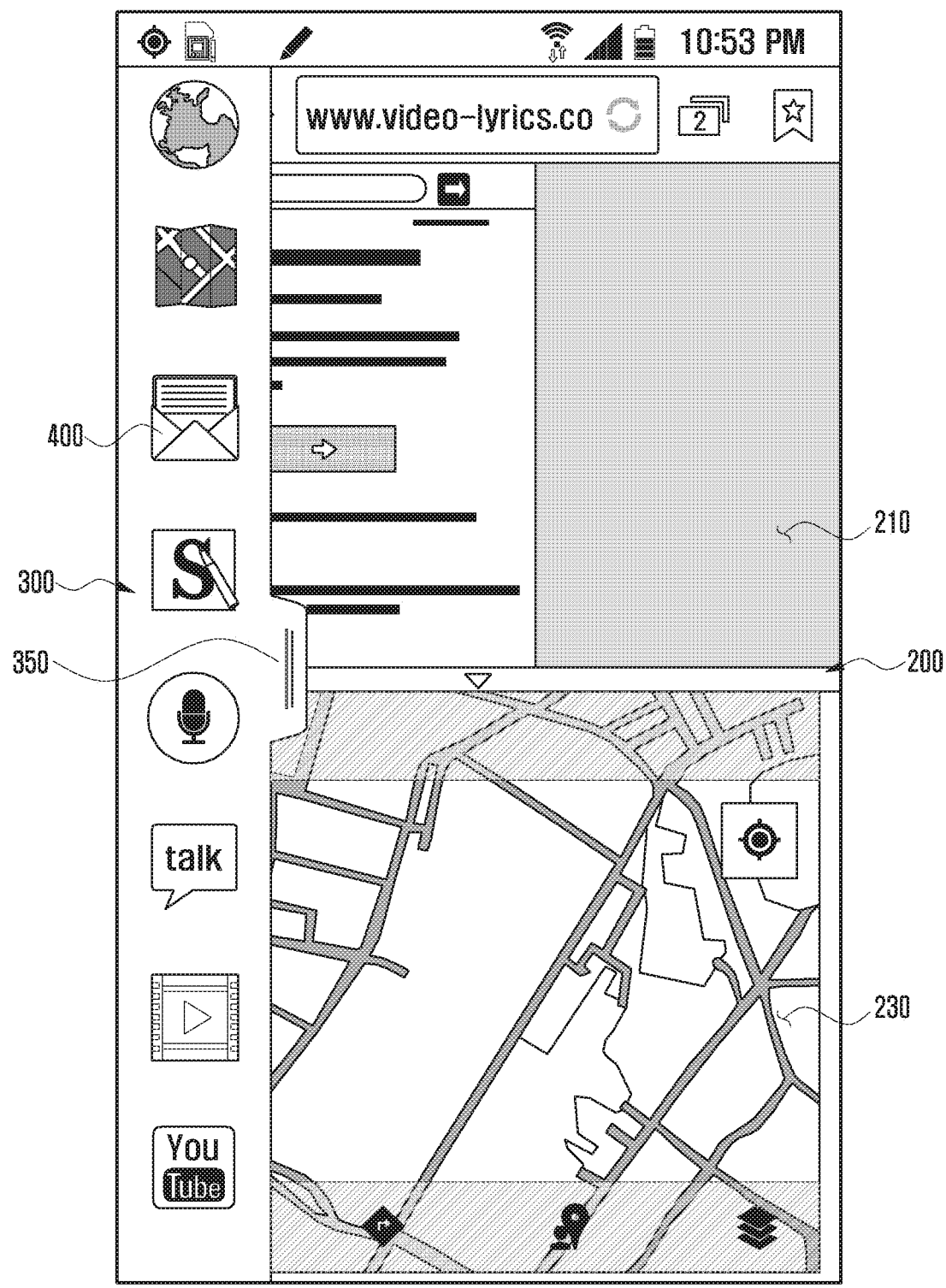
FIG. 2 is a diagram of a screen schematically illustrating a screen interface in a touch device according to an embodiment of the present disclosure.

FIG. 2 is a diagram of a screen schematically illustrating a screen interface in a touch device according to an embodiment of the present disclosure.

Referring to FIG. 2, a screen interface for supporting a multi-window environment in a touch device according to certain embodiment of the present disclosure includes execution regions 210 and 230 split from one screen to display an execution screen of an application. That is, within the screen there are separate execution regions 210 and 230 in which execution screens relating to separate applications can be displayed. Each execution region 210 and 230 may be referred to as a separate window, and collectively the separate windows may be referred to as multi-windows or a multi-window environment. Furthermore, the screen interface includes a separator 200 separating at least two execution regions 210 and 230 split according to a split scheme to adjust a window size of the execution regions 210 and 230. The split scheme refers to the relative disposition and size of the two or more execution regions 210 and 230 or windows within the multi-window environment. It will be appreciated that if there are more than two windows within the multi-window environment then further separators may be required. The respective execution regions 210 and 230 split according to the multi-window environment may include a navigation region, a scroll region, or a text input region which are independently formed according to the execution application or the respective execution applications.

Further, the screen interface of the present disclosure provides a tray 300 for conveniently supporting execution of an application using respective windows separated as a multi-window. The tray 300 is installed in the touch device and includes one or more execution icons (or a shortcut icon) 400 from among all executable applications or includes only some applications according to settings of the user. The tray 300 may be arranged such that it appears to slide-in (i.e., be displayed) on the screen or to slide-out and be hidden from the screen. The tray 300 may include a handle item 350 capable of receiving a user command (for instance a touch input or a touch and drag input) for switching between the slide-in in a slide-out state. In addition, the tray 300 may support scrolling through execution icons 400 in the tray 300 and the execution icon 400 in the tray 300 may be corrected, added, or removed according to user selection. Although it has been illustrated in FIG. 2 that the tray 300 is disposed in a row, the tray 300 may be disposed in two or more rows, which may be changed according to user selection.

Although it has been illustrated in FIG. 2 that a screen of a touch device is split into two execution regions (i.e., windows) 210 and 230 through one separator 200, according to an embodiment of the present disclosure, the screen of the touch device may be split into a larger number of windows up to a maximum number N (N>1, N=natural number) where N is proportional to the screen size. Accordingly, one or more separators 200 may be provided in response to the number of windows, that is, according to the split scheme that configures a multi-window environment. For example, when the screen of the touch device is split into two execution regions as shown in FIG. 2, one separator 200 may be provided. When the screen of the touch device is split into three execution regions, two separators 200 may be provided. When the screen of the touch device is split into four execution regions, two or three separators 200 may be provided according to the split region.

FIG. 3 is a diagram schematically illustrating an operation of a multi-window in a touch device according to an embodiment of the present disclosure.

Referring to FIG. 3, a screen example of reference numeral <301> indicates a screen example of a touch device when the touch device executes an Internet application. More particularly, the screen of reference numeral <301> indicates a state in which the Internet application is displayed as a full screen through one window. The full screen consumes all or substantially all of the available screen space (which may, for instance, be less than the total screen size to allow for status bars to be continuously displayed).

A screen example of reference numeral <303> indicates a screen example of a touch device when two applications are executed through a multi-window. For example, the user may additionally execute a map (MAP) application in a state in which a full screen of the Internet application is displayed. Accordingly, as shown in the screen example of reference numeral <303>, one screen is split into different execution regions by two windows through the separator 200, and execution screens of an Internet application and a MAP application are provided through respective execution regions (windows). In this manner, a plurality of applications split among at least two screens may be simultaneously operated according to embodiments of the present disclosure.

A screen example of reference numeral <305> indicates a screen example where sizes of respective windows are changed according to a user operation from a screen of reference numeral <330>. For example, the user moves (e.g., a touch & drag) the separator 200 to adjust a window size of an execution region in which the Internet application is executed and an execution region in which a MAP application is executed. According to embodiments of the present disclosure, when adjusting the window size by movement of the separator 200, the screen size of the application may be suitably changed according to a variation in the window size of a corresponding execution region.

Figure 4:
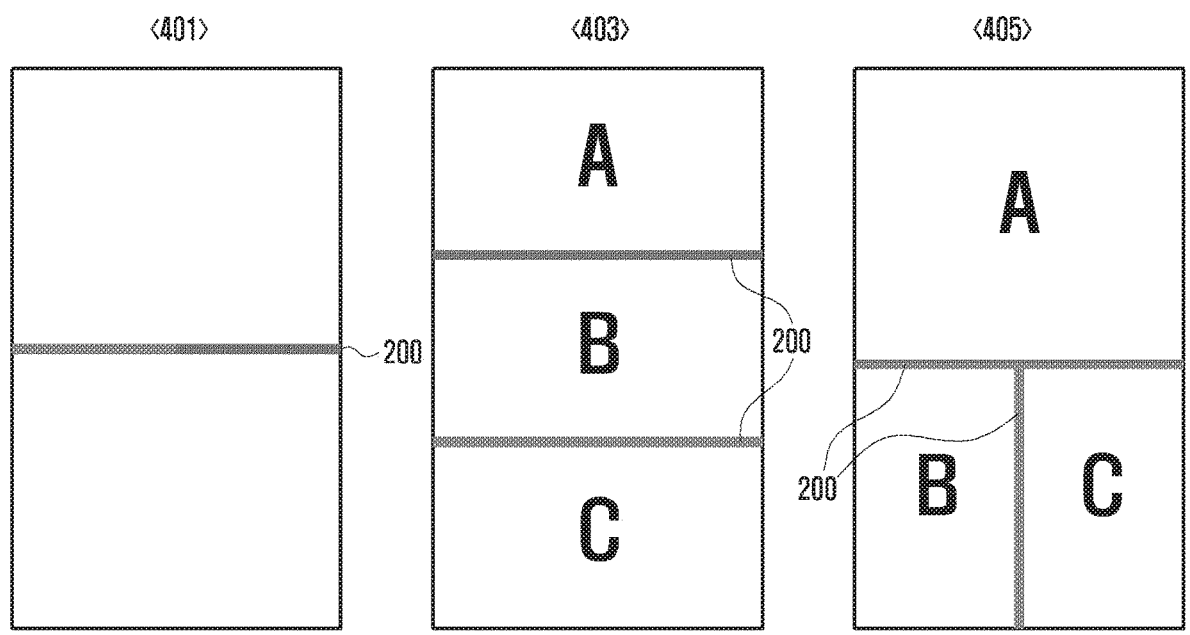
FIG. 4 is a diagram schematically illustrating an operation for splitting a multi-window in a touch device according to an embodiment of the present disclosure.

FIG. 4 is a diagram schematically illustrating an operation for separating a multi-window in a touch device according to an embodiment of the present disclosure.

Referring to FIG. 4, a screen example of reference numeral <401> indicates a case where a screen is split into two windows for a multi-window environment and a screen example when an application A and an application B are executed through two windows separated through one separator 200.

Screen examples of reference numerals <403> and <405> indicate a case where a screen is split into three windows for a multi-window environment, and indicates a screen example when applications A, B, and C are executed through three windows using two separators 200.

As illustrated in screen examples of reference numerals <403> and <405>, the screen split of the present disclosure may be separated into various forms according to settings of the user, and the split scheme may be pre-defined.

FIGS. 5, 6, 7, 8, 9, 10, 11, and 12 are diagrams illustrating examples of an operation screen operating a tray for rapidly executing an application in a multi-window environment according to embodiments of the present disclosure.

Referring to FIGS. 5, 6, 7, 8, 9, 10, 11, and 12, FIG. 5 illustrates a screen example of a touch device when the touch device displays an idle screen (or home screen).

Figure 5:
FIGS. 5, 6, 7, 8, 9, 10, 11, and 12 are diagrams illustrating examples of an operation screen operating a tray for rapidly executing an application in a multi-window environment according to an embodiment of the present disclosure.

Although an idle screen is displayed as a full screen in the screen example of FIG. 5, an execution screen of a specific application may be displayed as a full screen. More particularly, FIG. 5 illustrates an example where the idle screen is operated in a normal mode before operating the multi-window environment. That is, according to an embodiment of the present disclosure, the touch device may be operated in a multi-window mode and a normal mode and may switch between the two.

Figure 6:
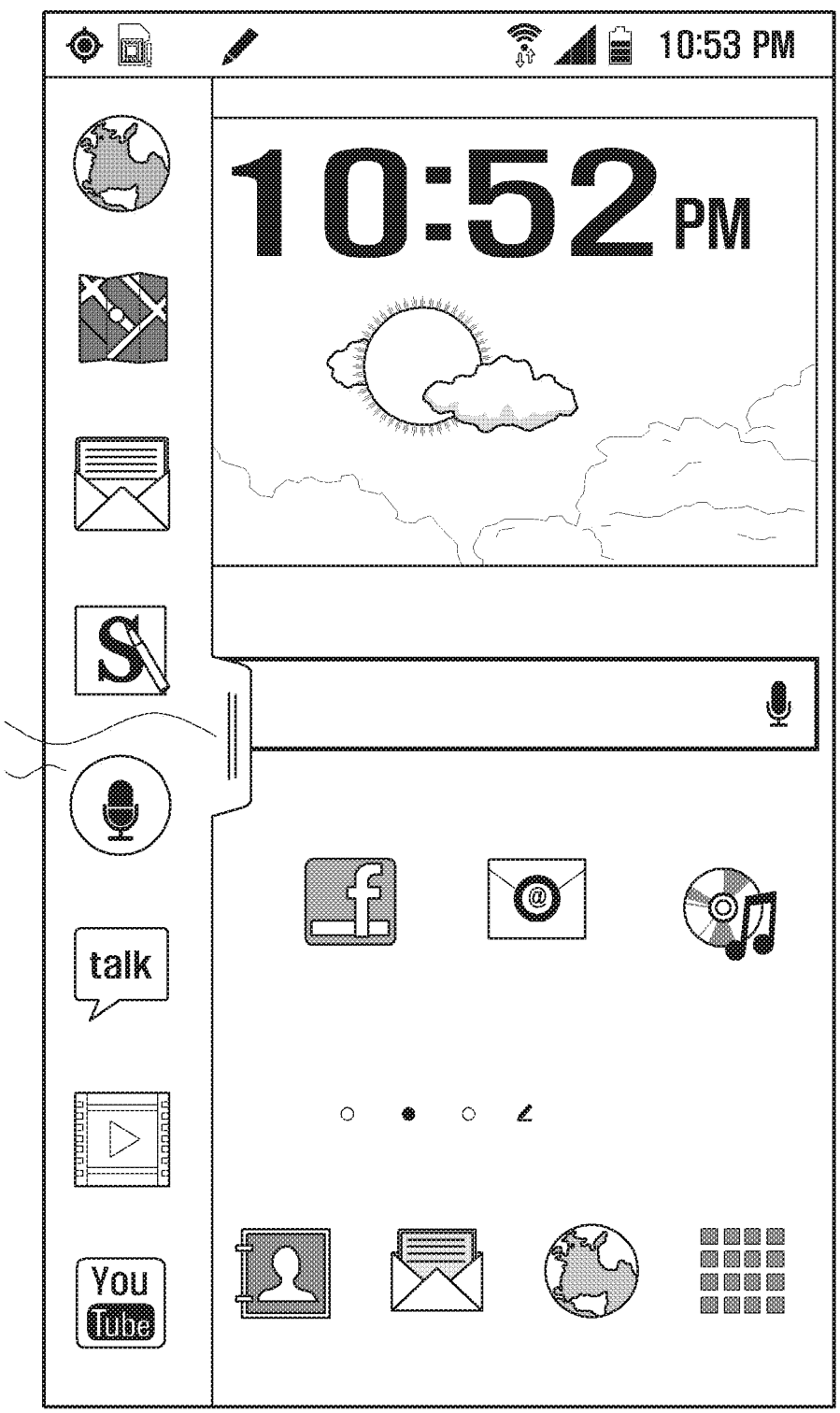

The user may activate the tray 300 to be indicated on the idle screen as illustrated in FIG. 6 in a state in which the idle screen is displayed, according to an embodiment of the present disclosure. For example, the user may input a menu operation through the displayed idle screen of the touch device to display the tray 300. Alternatively, the tray 300 may be displayed through selection of a function key for executing a multi-window mode, or in response to a touch event set to execute the multi-window mode (e.g., a gesture having a specific pattern such as figures and characters). Accordingly, the touch device may activate and indicate (display) a tray 300 on a pre-set region on an idle screen as shown in FIG. 6. For example, the tray 300 may be disposed at a left frame (a left edge) of a rectangular full screen such that the full screen (currently displaying the idle screen in FIG. 6) is reduced in size. The tray 300 also may be provided in the form of an overlay through a separate layer on a currently displayed screen, and may have a handle item 350, such that the tray 300 overlaps the idle screen, as shown in FIG. 6.

Figure 7:
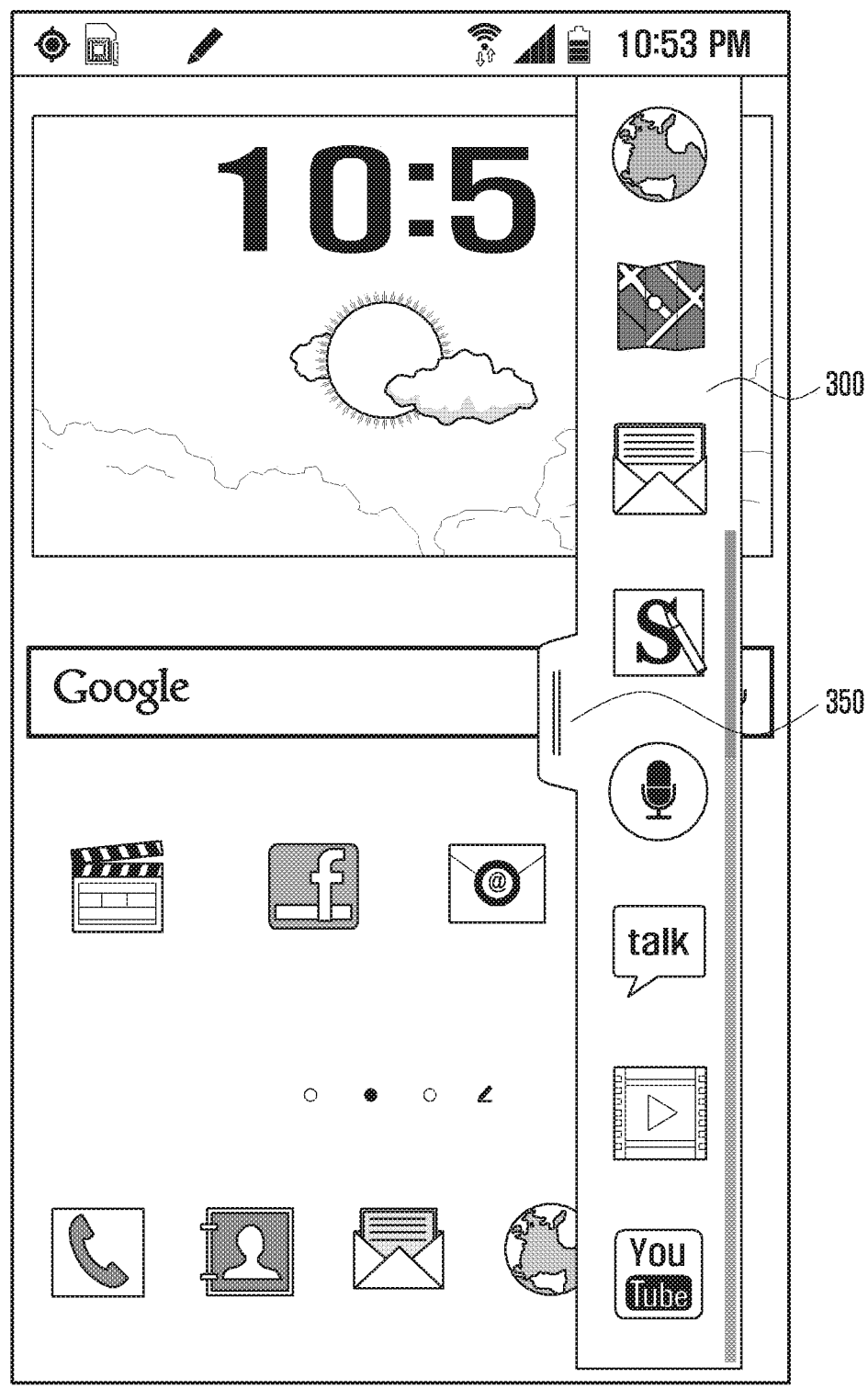

The user may input a movement event (e.g., a touch & drag) moving the tray 300 to another region on a screen as shown in FIG. 7 in a state in which the tray 300 is displayed on an idle screen, according to an embodiment of the present disclosure. For example, the user may touch a part of the tray 300 to input a movement event to drag the tray to a different part of the screen (for instance, an opposite direction of a screen (e.g., a right frame direction of a window (a right edge direction of the screen)). Accordingly, the touch device may provide a User Interface (UI) or a Graphic User Interface (GUI) that separates the tray 300 from the left frame according to the movement event to move with the drag in response to the drag of the user. In this case, when the tray 300 is moved in a specific direction greater than a predetermined range (e.g., based on a center of a screen) in response to a drag movement of the user, the touch device may change and display a direction of a handle item 350 of the tray 300. That is, the touch device may differently display the handle item 350 for sliding-in the tray 300 in a screen according to a region in which the tray 300 is located. For example, the handle item 350 illustrated in FIG. 6 may be switched to a direction of a handle item 350 as illustrated in FIG. 7 according to a movement of the tray 300.

Figure 8:
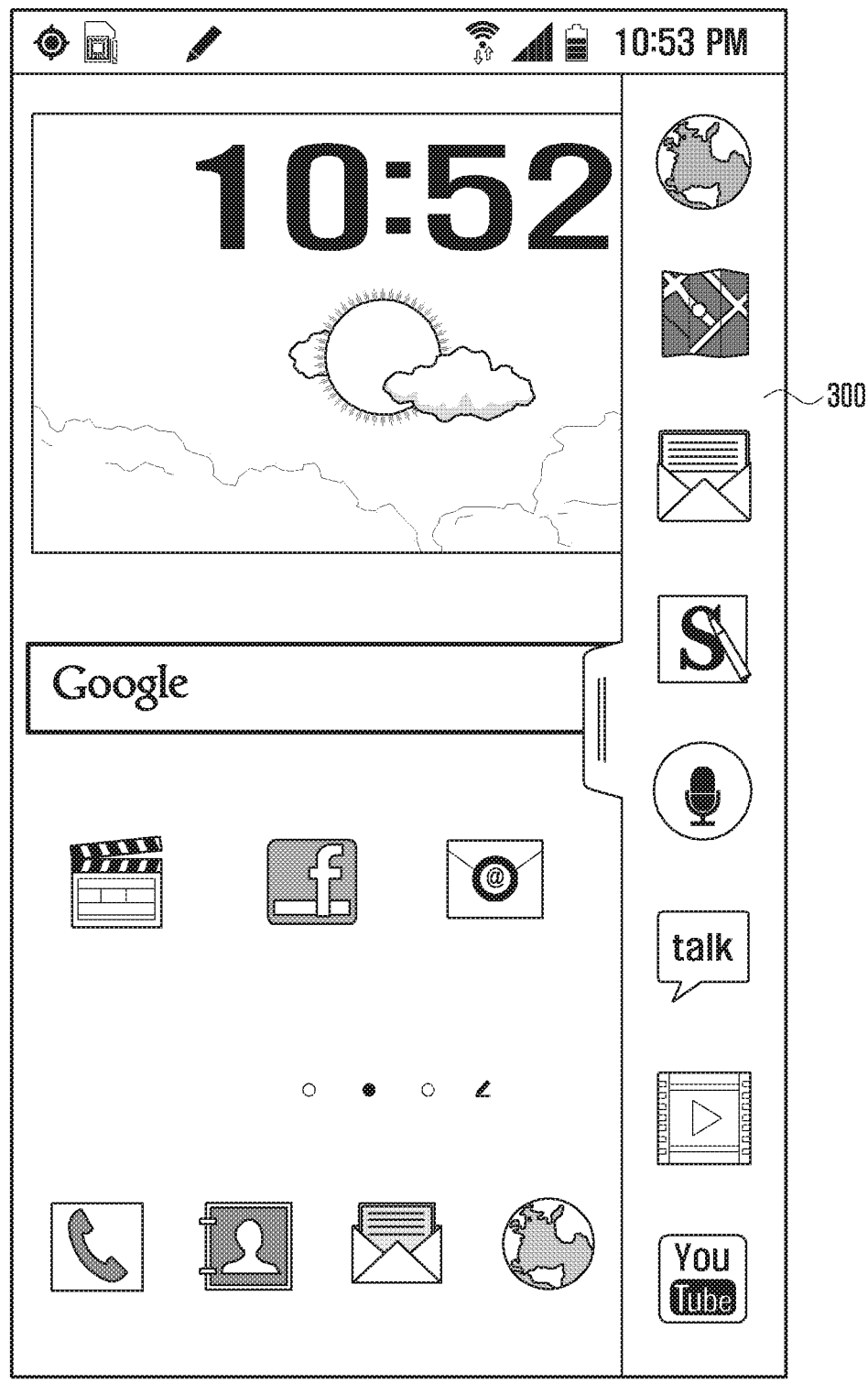

Referring to FIG. 7, the user may move the tray 300 close to a desired region to release the input movement event. That is, the user may release drag input for moving the tray 300. Then, the touch device may determine a moved region of the tray 300 and arrange and display the tray 300 on the determined region. For example, as shown in FIG. 8, the touch device may arrange and provide the tray 300 at a right frame of a window (a right edge of the screen). That is, if a user input for moving the tray 300 is released, the touch device displays a screen as illustrated in FIG. 8. That is, a tray 300 provided in the screen in the touch device shown in FIG. 6 is switched as illustrated in FIG. 8 according to a movement of the tray 300. The touch device may determine an arranged region of the tray 300 according to a movement degree of the tray 300. For example, the touch device may arrange the tray 300 at a window frame (screen edge) closest to the moved region (based on a point of contact of a user input on the tray 300). For instance, when the user input is released when the tray 300 is closest to the left frame (the left edge of the screen), the tray 300 is arranged and displayed at the left frame (the left edge). When the user input is released when the tray 300 is closest to a respect right, upper or lower frame (edge of the screen), the tray 300 is arranged and displayed at the respective right, upper or lower frame (edge).

Figure 9:
Figure 10:
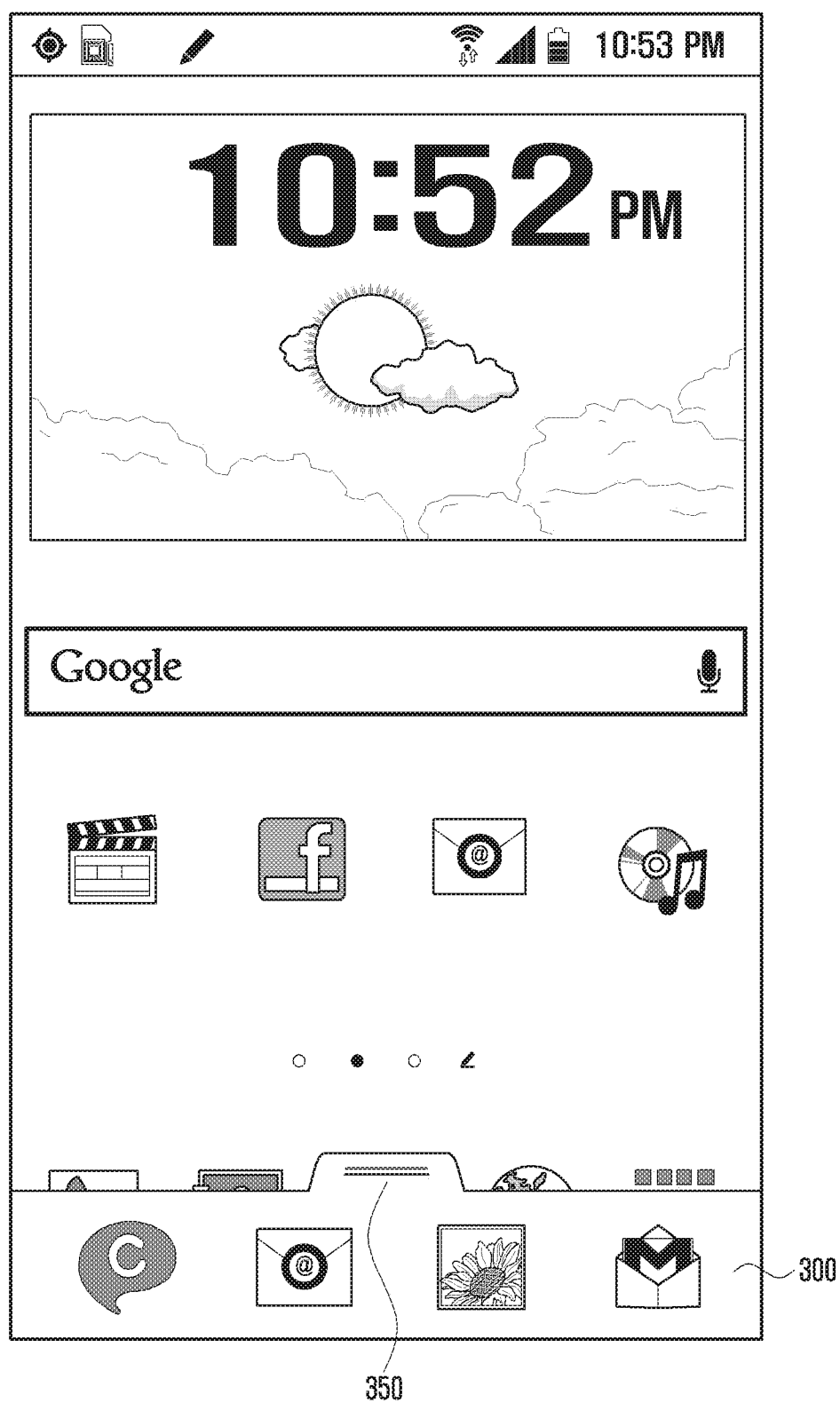

In this manner, screen examples where the tray 300 is arranged in different locations according to a user input are illustrated in FIG. 6 (arranged at a left frame), in FIG. 8 (arranged at a right frame), in FIG. 9 (arranged at an upper frame), and in FIG. 10 (arranged at a lower frame). That is, according to embodiments of the present disclosure, referring to FIGS. 6 to 10, an arranged location of the tray 300 may be changed in real time according to user input.

Figure 11:

FIG. 11 illustrates a screen example of a slide-out, that is, a hidden state in a state in which the tray 300 is arranged at a lower frame as shown in FIG. 10.

Referring to FIG. 11, if the tray is slid-out, the tray 300 is not displayed on a screen but only a handle item 350 of the tray 300 may be displayed. In the present disclosure, a slide-out of the tray 300 is achieved by a user input using the handle item 350, or the tray 300 may be automatically slid-out when the user input does not occur for a predetermined time in a slide-in state. When a specific execution icon 400 is selectively moved to the screen from the tray 300 according to the user input, the tray 300 may be automatically slid-out.

Further, when the user touches a user input (e.g., handle item 350) and moves (i.e., a drag, a flick, or the like) it in an inner direction of a screen in a state in which the tray 300 is slid-out, the tray 300 may be slid-in.

Figure 12:
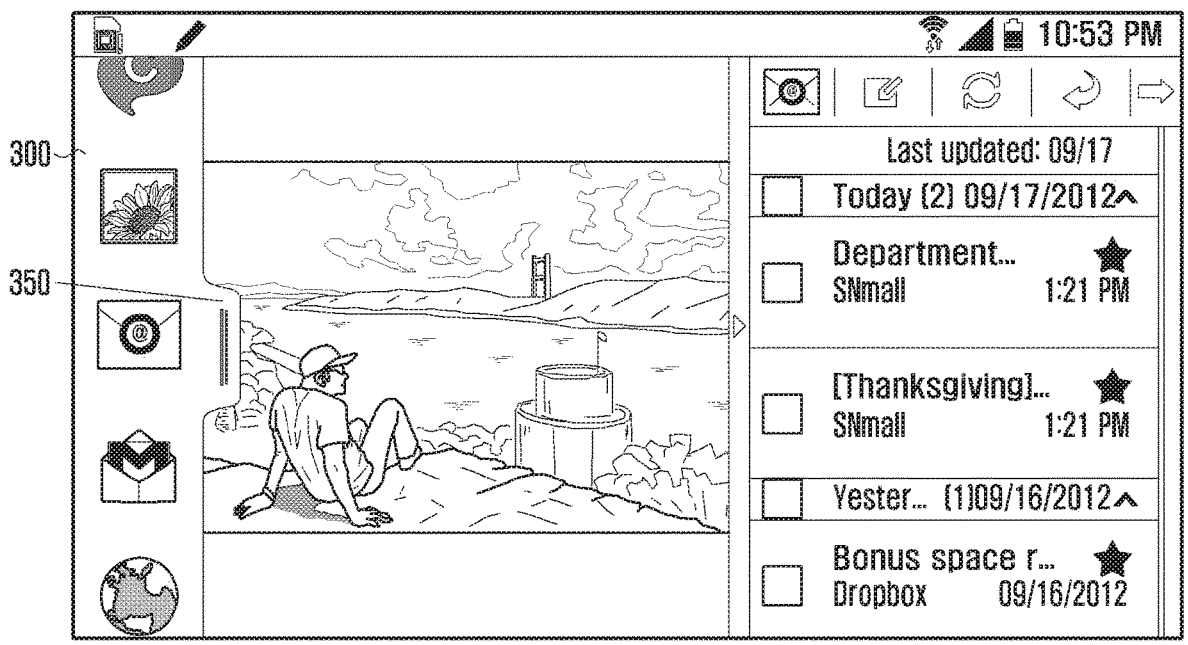

FIG. 12 illustrates a screen example when a screen of a landscape mode is displayed according to a rotation of the touch device in a screen display of a portrait mode as illustrated in FIGS. 6, 7, 8, 9, 10, and 11, according to embodiments of the present disclosure. When the touch device is switched from the landscape mode to the portrait mode or from the portrait mode to the landscape mode, the tray 300 may be arranged and provided at a location corresponding to a direction arranged in a previous mode. For example, when the touch device switches the landscape mode to the portrait mode in a state in which the tray 300 is arranged at a left frame at a time point of viewing a screen of the user (a left edge of the landscape mode), the tray 300 may be automatically arranged and provided at a left frame at a time point of viewing the screen of the user (a left edge of the portrait mode). That is, regardless of switch of the mode, the tray 300 may be arranged and provided at the same location based on a time point of the user.

Referring to FIG. 12, screens of respective applications of split execution regions (windows) are rotated and provided according to a mode switch, and the window size split by the separator 200 may be maintained in accordance with a previous state.

FIGS. 13, 14, 15, 16, and 17 are diagrams illustrating examples of an operation screen operating a plurality of applications in a multi-window environment according to an embodiment of the present disclosure.

Figure 13:
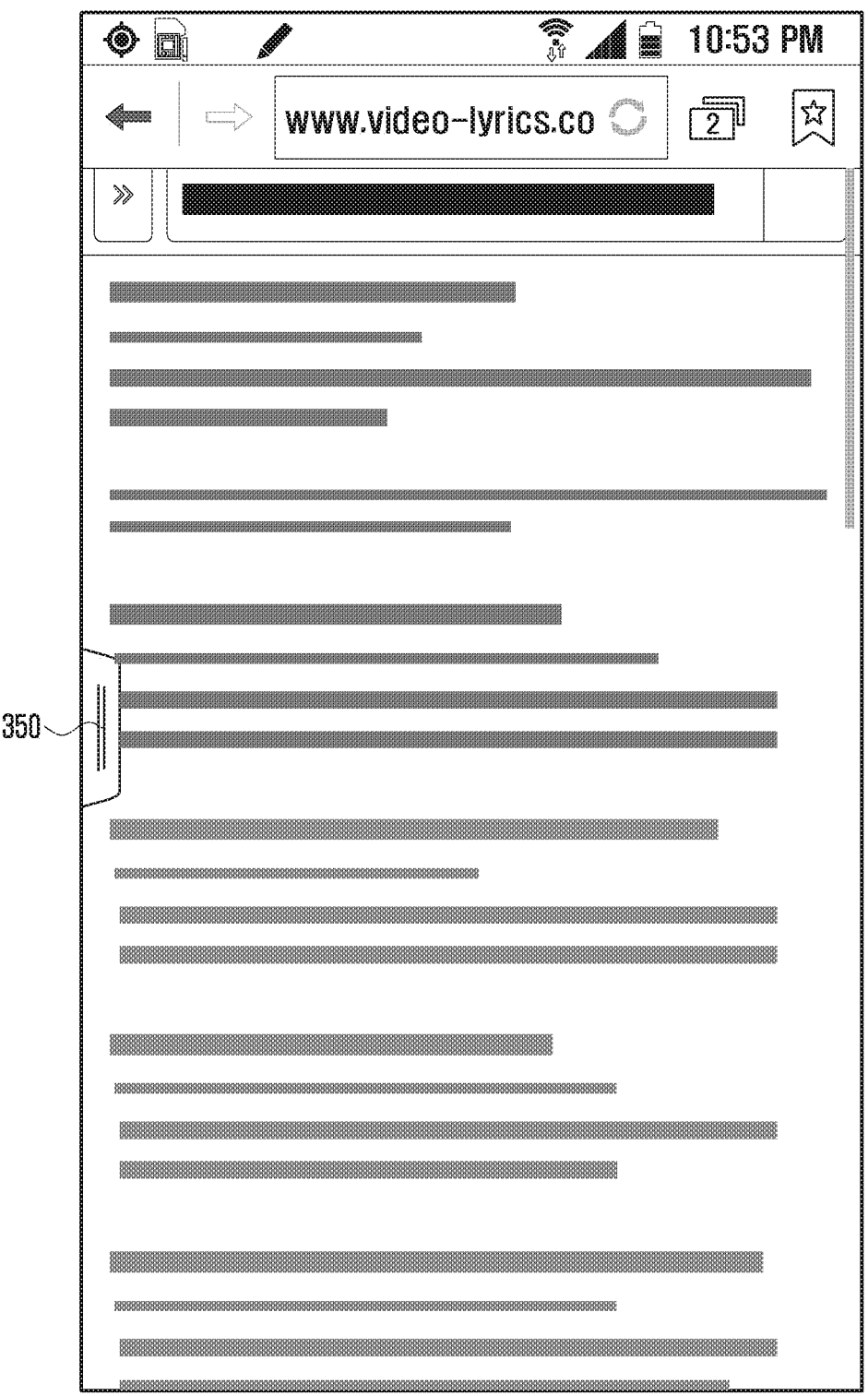
FIGS. 13, 14, 15, 16, and 17 are diagrams illustrating examples of an operation screen operating a plurality of applications in a multi-window environment according to an embodiment of the present disclosure.

Referring to FIGS. 13, 14, 15, 16, and 17, FIG. 13 illustrates a screen example of a touch device when the touch device executes one application (e.g., Internet application) as a full screen. As shown in FIG. 13, the tray 300 is activated, slid-out, and hidden on the screen so that only the handle item 350 is displayed on the screen.

Figure 14:
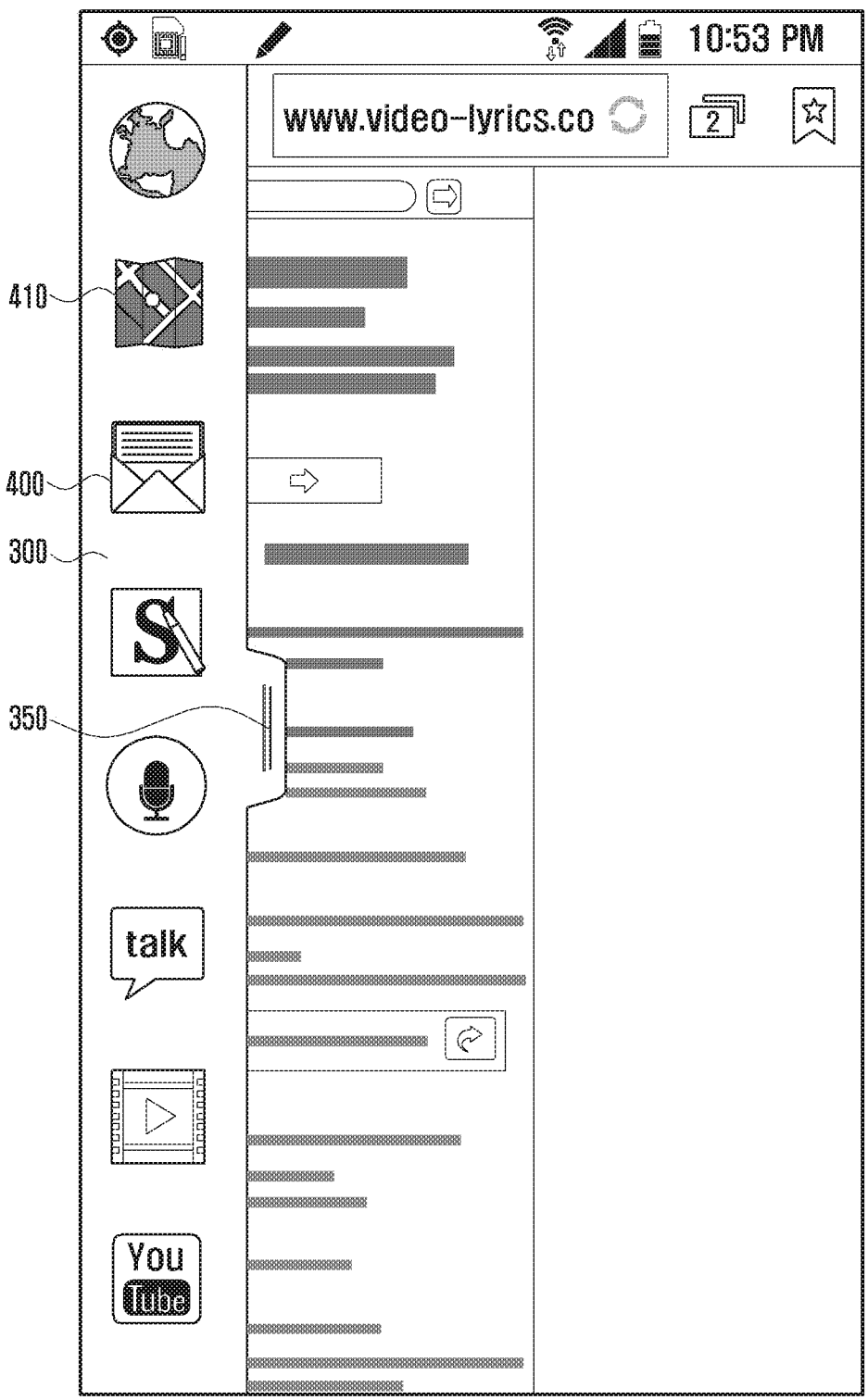

The user may select (e.g., touch & drag) the handle item 350 in a state in which the Internet application is displayed to slide-in the tray 300 on a screen as shown in FIG. 14. When the user input with respect to the handle item 350 is detected in a state the tray 300 is slid-out, the touch device displays a screen as shown in FIG. 14. That is, a screen of the touch device illustrated in FIG. 13 is switched according to the user input as illustrated in FIG. 14.

The user may select an execution icon 410 of an application to be additionally executed according to a multi-window environment from among application execution icons 400 previously registered in the tray 300 to input an event moving on a screen in a state in which the tray 300 is displayed. For example, the user selects (i.e., touches) an execution icon 410 capable of executing a map application in the tray 300 and inputs an event moving (i.e., dragging) the execution icon into the screen region currently displaying Internet application while the touch is maintained.

Figure 15:
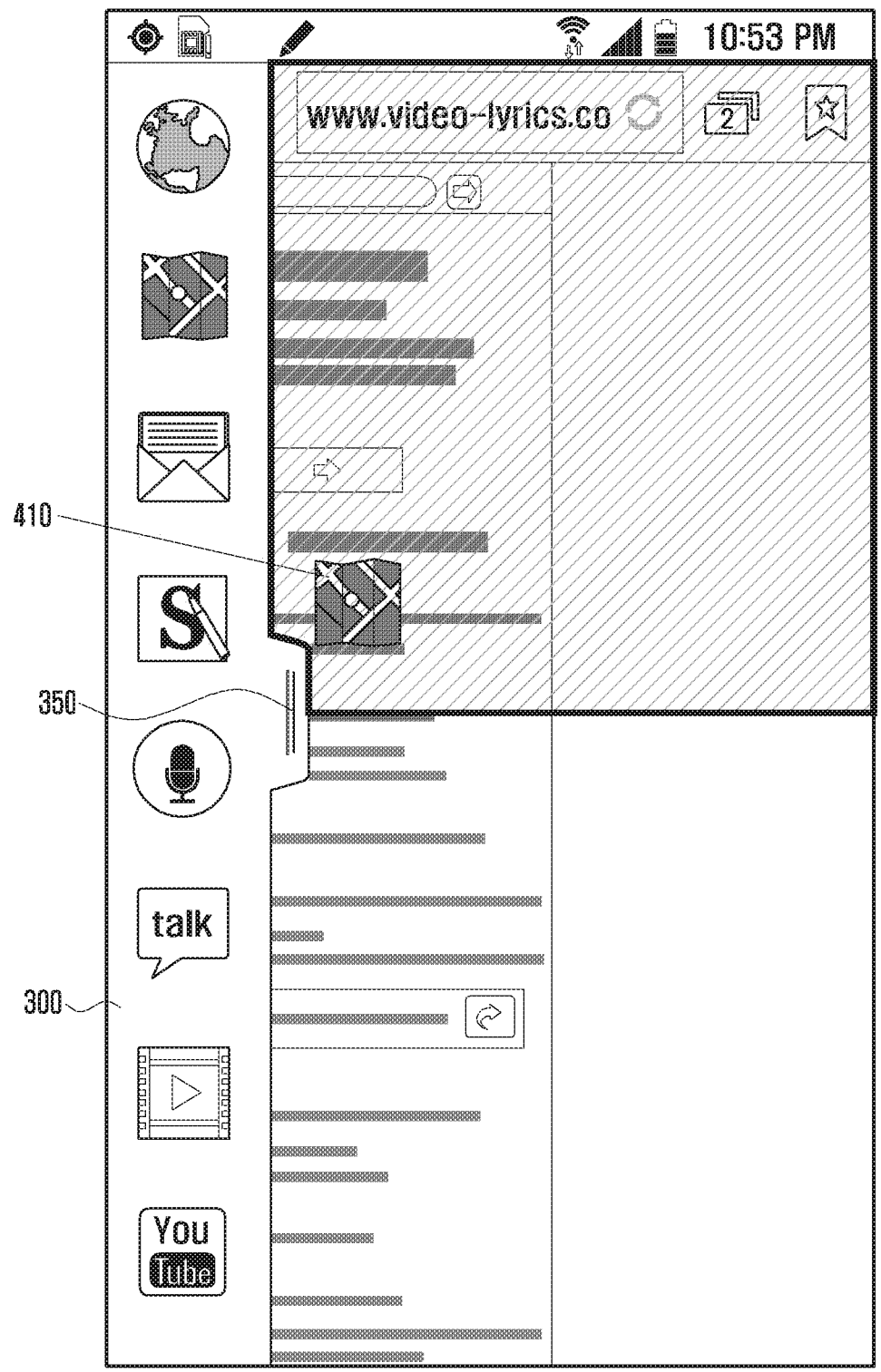

Then, the touch device displays a state in which the execution icon 410 is moved into the screen in response to a user input as shown in FIG. 15. In this case, the touch device confirms a region in which the execution icon 410 is located and a split scheme as illustrated in FIG. 15 and outputs a feedback for an execution region to which an application of the execution icon 410 is to be executed to the user (illustrated by the hashed box in FIG. 15). The feedback may be expressed by various schemes which may be intuitively recognized by the user such as focusing a corresponding window in which the execution icon 410 is located among windows of the split execution region, highlighting and displaying only a corresponding window, or changing a color of a corresponding window.

When an execution icon 410 in the tray 300 enters in the screen according to the user input, UI or GUI may provide a fade out effect such that a space in which the execution icon 410 is located in the tray 300 is remained as a blank. Further, when the execution icon 410 is separated from the tray 300 and enters in the screen, the tray 300 may be slid-out. That is, a screen of the touch device illustrated in FIG. 15 may be switched as illustrated in FIG. 16 according to the user input.

The blank processing of the present disclosure is provided for intuition of the user. When the tray 300 is slid-out, that is, when FIG. 15 is switched to FIG. 16, a blanked processed space from the tray 300 according to separation of the execution icon may have an original shape. That is, as illustrated in a screen example of FIG. 18 to be described later, a space in which the execution icon 410 is located may be provided in a state in which a corresponding to when icon is present.

Figure 16:
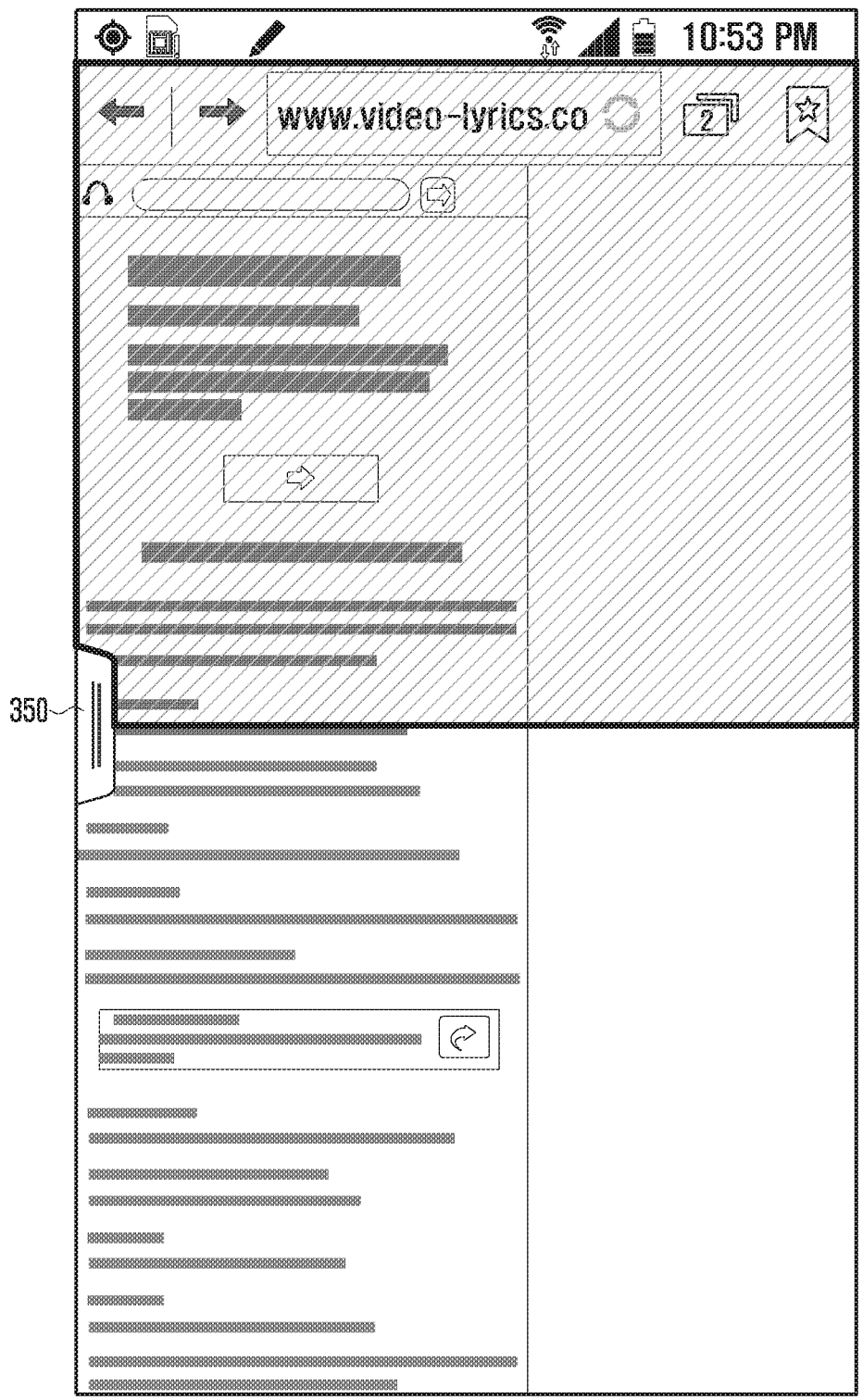

Further, in the case of FIGS. 15 and 16, a multi-window environment may be split into two execution regions having two windows with an upper window and a lower window. In addition, FIG. 15 illustrates a case where the current location of the execution icon 410 is in a current upper window according to a user input, and where the lower window is focused when the execution icon 410 is moved to a lower side of the screen in a state in which the touch input at the execution icon 410 is maintained.

Referring to FIG. 16, the user may move the execution icon 410 to a lower side of the screen in a state in which a touch input to the execution icon 410 is maintained, and input an event of releasing a touch input to the execution icon 410 in the lower window. For example, when the lower window is focused and displayed in a state in which the execution icon 410 is dragged and moved to the lower window, the user may release (i.e., drag & drop) a touch input to the execution icon 410.

Figure 17:
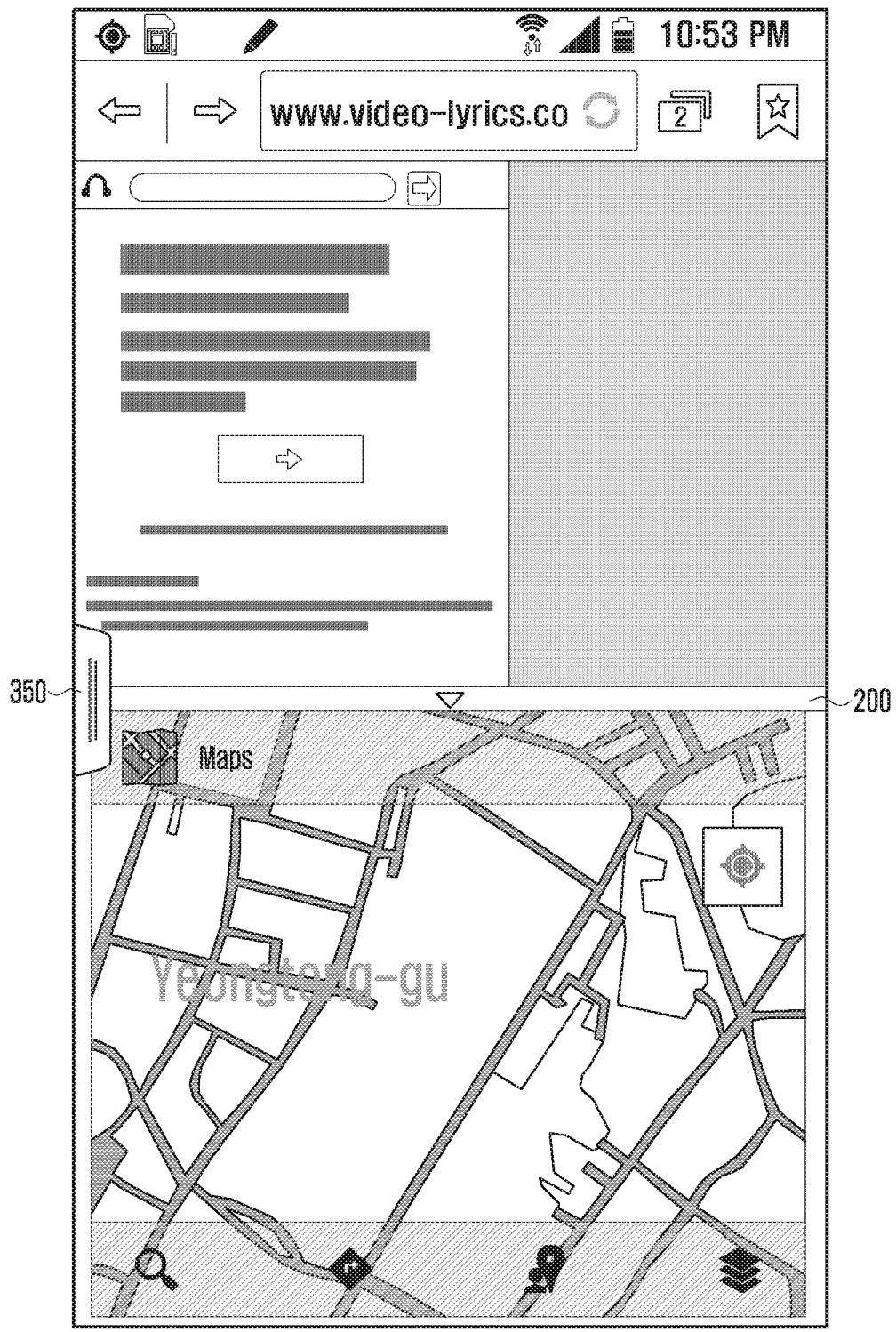

Accordingly, referring to FIG. 17, the touch device executes an application (i.e., the map application) associated with the execution icon 410 in response to the user input and displays an execution screen of the application on the lower window. In this case, if a full screen is executed with a previous application, such as the Internet application and execution of an additional application such as the map application is detected, the touch device separates the full screen into two split execution regions through the separator 200 to form two separate windows. Further, the touch device displays a screen of the additional application (i.e., map application) through a window (e.g., a lower window) of an execution region in which the execution icon 410 is located, and displays a screen of the previous application (i.e., Internet application) through a window (e.g., an upper window) of another execution region.

In this case, upon execution of the additional application, the touch device displays a screen of a suitable size corresponding to a window (e.g., a lower window) size of an execution region in which the additional application is executed. Further, the touch device displays a screen of the previous application as a full screen or a partial screen in a window (e.g., an upper window) of a split execution region according to a characteristic of a previous application, and displays a screen of the additional application in a window (lower window) of another split execution region as a full screen or a partial screen upon splitting the screen.

For example, when the previous application and the additional application are each an application capable of playing content, such as a video, the touch device may change to a screen of a suitable size corresponding to a window (e.g., an upper window and a lower window) of a split execution region and display a play screen in a corresponding window as a full screen. When the previous application and the additional application are each an application capable of displaying a text or a list, such as an Internet application, the touch device may display only a partial screen corresponding to a size of a corresponding window (i.e., upper window, lower window) of the split execution region.

As illustrated in screen examples of FIGS. 13, 14, 15, 16 and 17, according to embodiments of the present disclosure, when the touch device executes an application, an execution screen of a first application may be displayed as the full screen. Further, the touch device may receive an execution event input (e.g., a user input which selects an execution icon 400 from the tray 300 and moves to the screen) for executing a second application from a user while displaying the first application as a full screen. In this case, when the execution event is moved into the screen while not being released, the touch device may output feedback with respect to the window of a location to which the execution event is moved (i.e., a location to which the execution icon 400 is being moved (i.e., dragged) according to a user input). Further, when the execution event is released in a moved specific window (e.g., when a user drops an execution icon 400 dragged into a region of a specific window after a selection thereof), a multi-window may be configured according to a pre-set split scheme, and screens of the first application and the second application may be independently displayed through respective split windows.

FIGS. 18, 19, 20, 21, 22, and 23 are diagrams illustrating examples of operating a plurality of applications in a multi-window environment according to an embodiment of the present disclosure.

Referring to FIGS. 18, 19, 20, 21, 22, and 23, FIG. 18 illustrates a screen example of a touch device when the tray 300 is slid-in according to the user input using a handle item 350 in a state in which the touch device displays screens of different applications through each window of two split execution regions as illustrated in FIG. 17.

Figure 19:
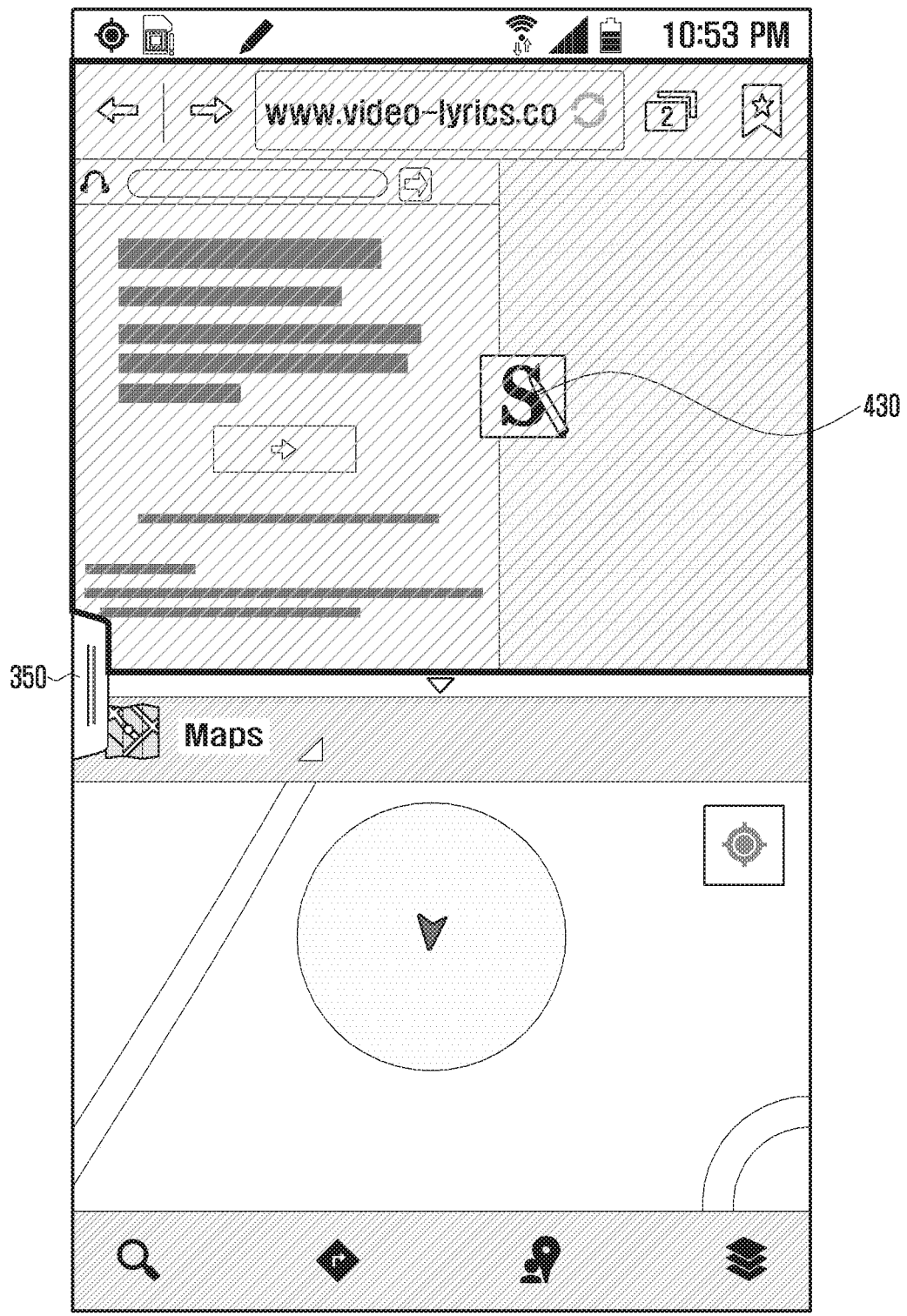

The user may select an execution icon 430 of an application (e.g., a note application) to be additionally executed from among execution icons 400 previously registered in the tray 300 in response to the foregoing operation and input an event moving on the screen as illustrated in FIG. 19.

Accordingly, the touch device moves the execution icon 430 into the screen in response to the user input as illustrated in FIG. 19, and outputs feedback for an execution region in which the execution icon 430 is to be executed in a corresponding location according to the movement to the user. A slide-out operation of the tray 300 according to the movement of the execution icon 430 and an execution operation of an application (e.g., a note application) of the execution icon 430 correspond to the foregoing operation. In this case, FIG. 19 illustrates a case where a touch input to the execution icon 430 is moved to an upper window of the screen and is released (i.e., drag & drop).

Figure 20:
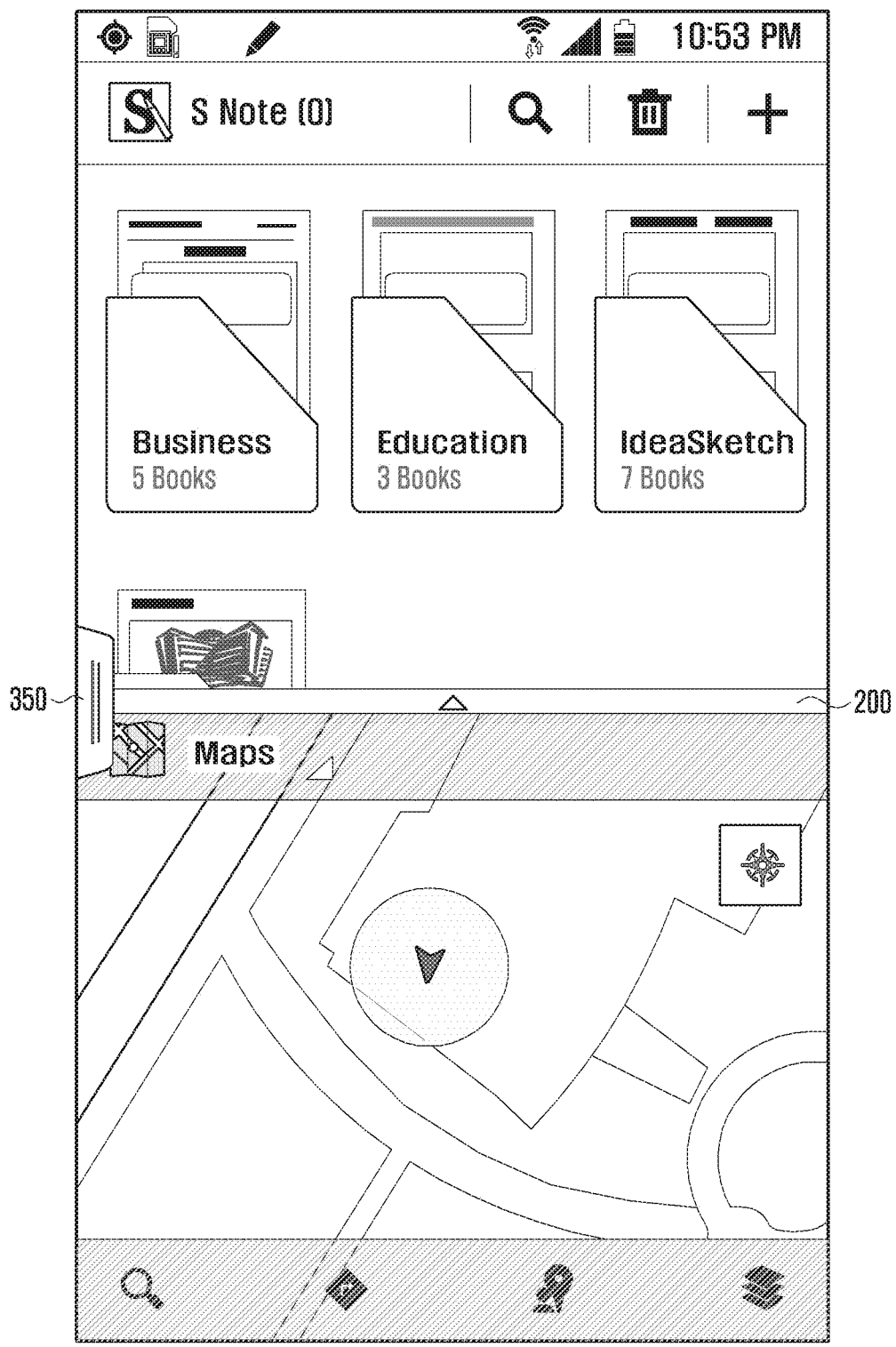

Referring to FIG. 20, the touch device executes an application (e.g., a note application) of an execution icon 430 in response to the user input and displays an execution screen of the application on an upper window. In this case, the touch device processes the application (e.g., an Internet application) previously executed through the upper window in the background (not displayed), and displays a screen of the additional application (e.g., a note application) whose execution is newly requested through the upper window. Further, the touch device may continuously execute the application (e.g., a map application) allocated to the lower window and continuously displays a screen (e.g., currently progressing screen) according to the execution state through the lower window.

Figure 18:
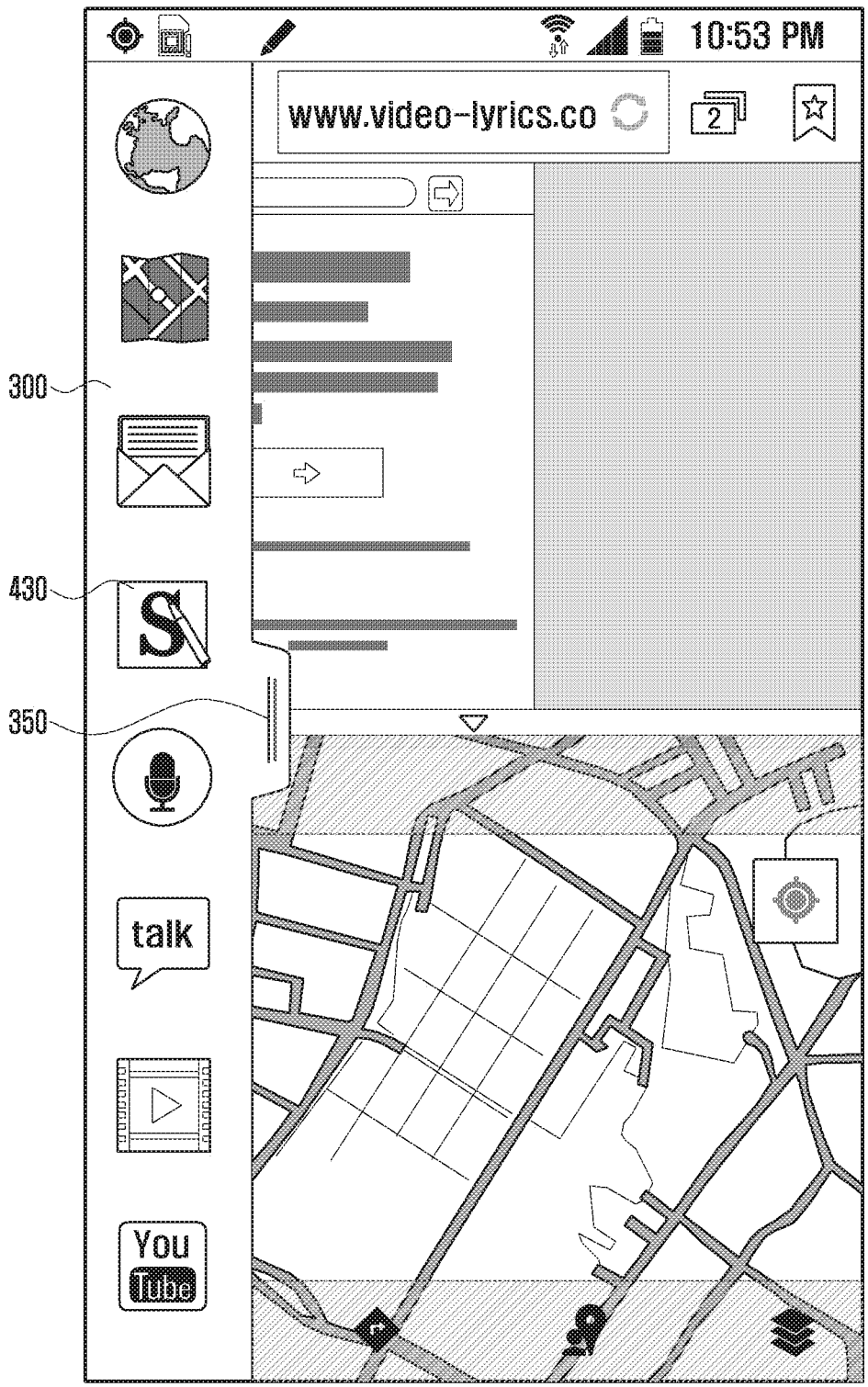
FIGS. 18, 19, 20, 21, 22, and 23 are diagrams illustrating examples of operating a plurality of applications in a multi-window environment according to an embodiment of the present disclosure.

In this manner, as illustrated in screen examples of FIGS. 18, 19, and 20, according to embodiments of the present disclosure, the touch device may receive a user input for executing an additional application while displaying a screen of a plurality of applications through the multi-window. Accordingly, the touch device may execute the additional application through a corresponding window selected from the user for executing the additional application. Upon executing the additional application, the application previously executed through the selected window may be processed as a background, and the additional application screen may be displayed through the selected window.

Figure 22:
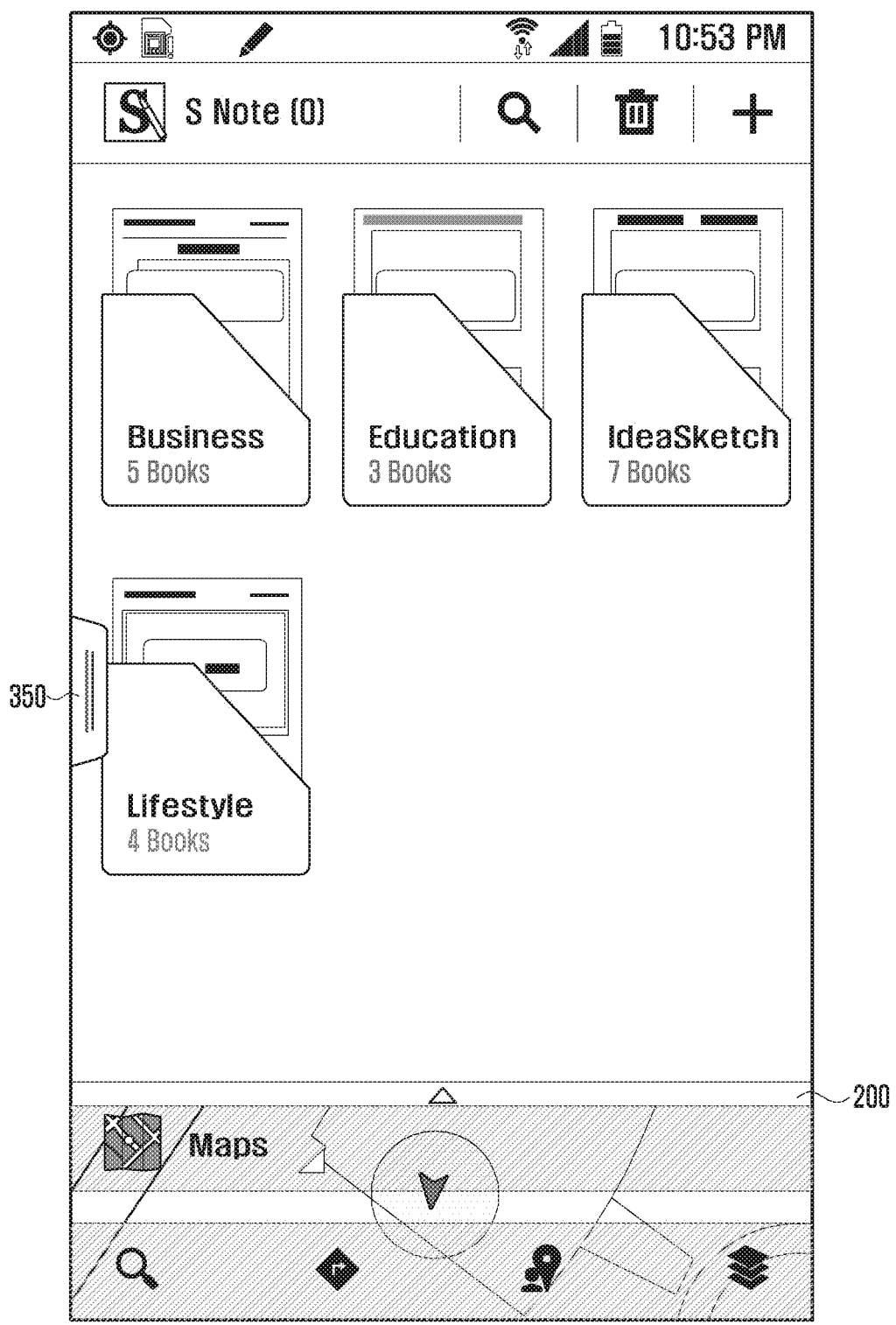
Figure 23:
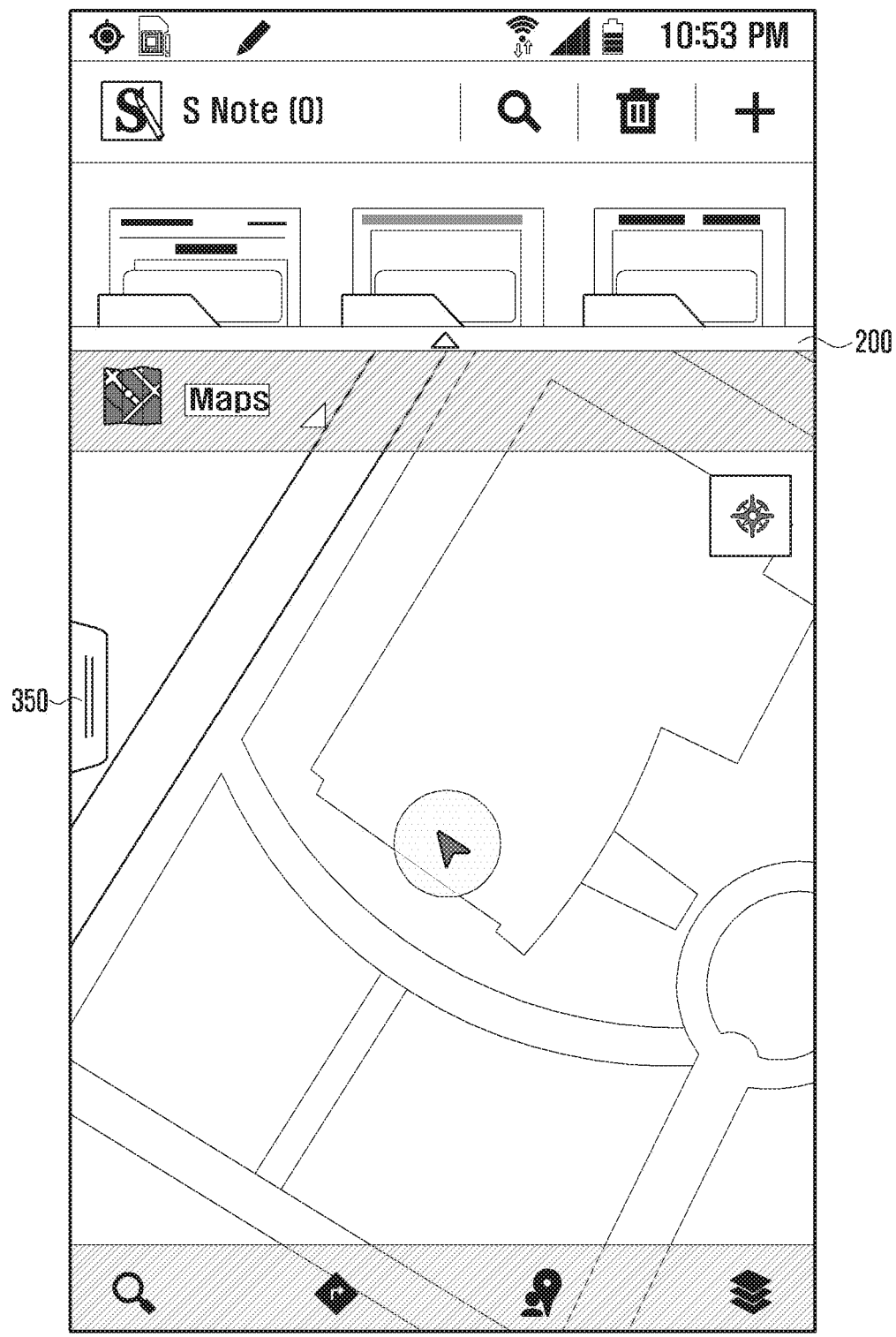
Figure 24:
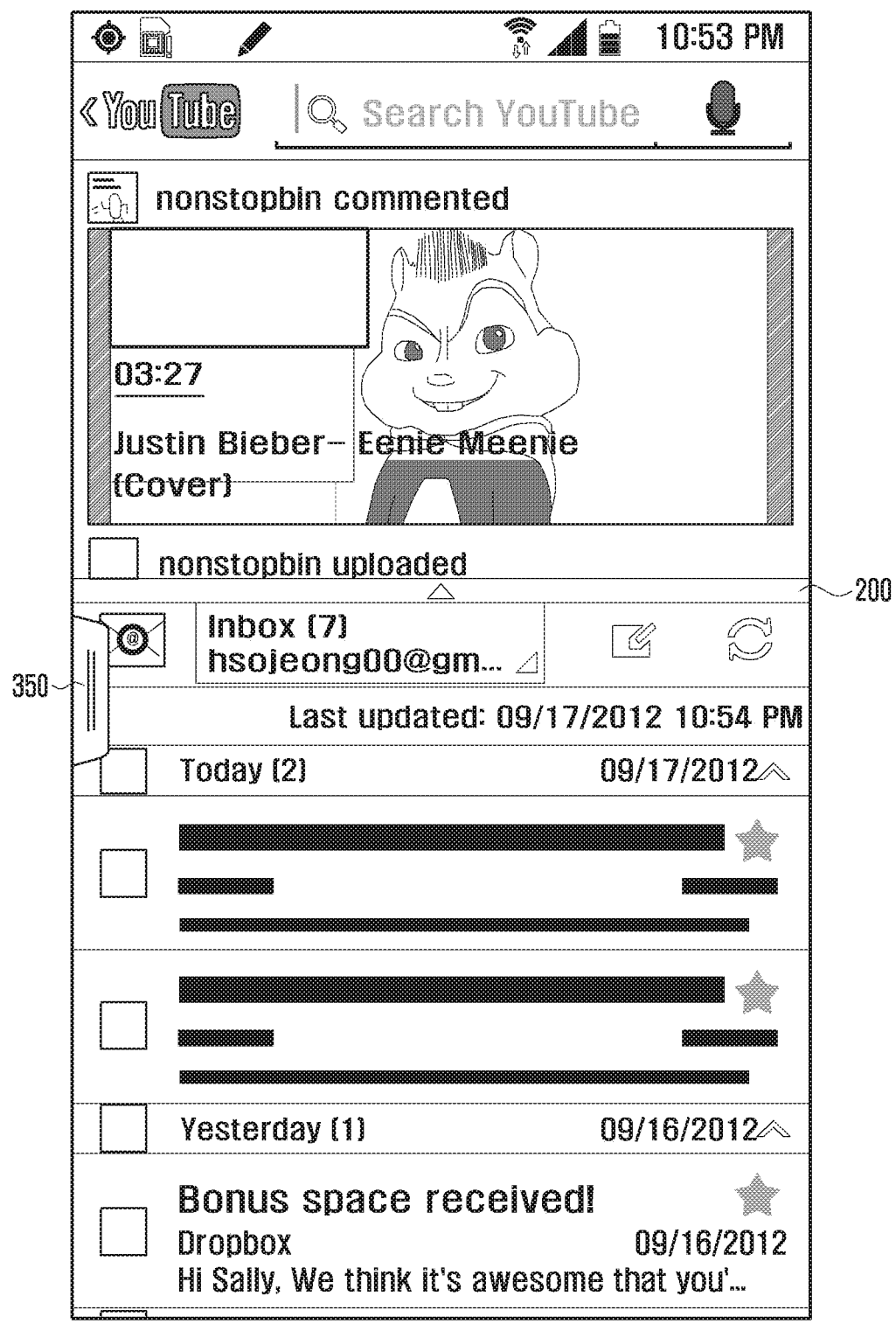
FIGS. 24, 25, 26, 27, 28, and 29 are diagrams illustrating examples of operating a key pad for text input in a multi-window environment according to an embodiment of the present disclosure.

The user may change the window size for two split execution regions through the separator 200 as illustrated in FIG. 20. That is, FIGS. 21, 22, and 23 illustrate an operation of changing the window size according to the user input in a state in which a window of split execution regions of the touch device is displayed.

Figure 21:
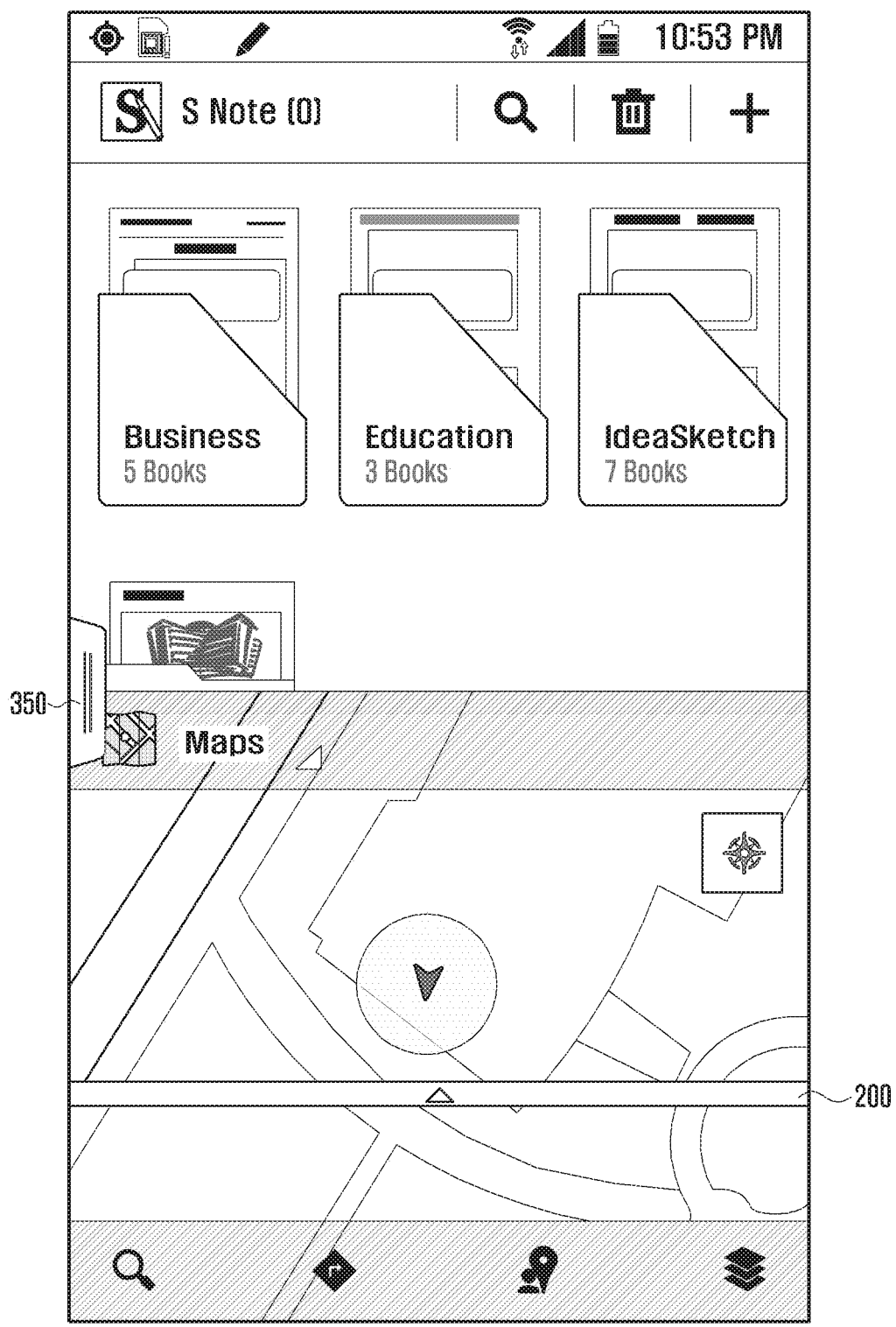

The user may input an event to select, as illustrated in FIG. 21, the separator 200 in a screen like FIG. 20 and to move the selected separator 200 in a specific direction (e.g., upward or downward). For example, the user may input an event which touches the separator 200 as illustrated in FIG. 21 and drags the separator 200 to a lower direction of the screen in a state in which the touch is maintained.

Accordingly, the touch device displays a moved state of the separator 200 in response to a user input as illustrated in FIG. 21. In this case, the touch device may change and display only a moving state of the separator 200 according to an user input while maintaining a screen of the application displayed through each window as a current state as shown in FIG. 21. However, according to embodiments of the present disclosure, the touch device may adaptively change and display a screen of an application according to a window size changed when the separator 200 is moved according to the user input through a window size control scheme.

The user may input an event which moves the separator 200 corresponding to a size ratio of each window to be adjusted and releases a touch input to the separator 200. For example, the user may drag the separator 200 and release (i.e., drag & drop) a touch input to the separator 200 in a state in which the separator 200 is moved to a location of the lower window as illustrated in FIG. 21.

Accordingly, the touch device changes and displays a window size according to movement of the separator 200 in response to the user input as shown in FIG. 22. In this case, the touch device changes and displays a display state of a screen of an application allocated to each window (e.g., upper window and lower window) according to variation in the window size. For example, as shown in FIG. 22, remaining hidden contents may be displayed according to increase of the window size on a screen of an application displayed on the upper window, and a screen of an application displayed on the lower window may be provided in a state in which a region displayed according to reduction of the window size is reduced.

FIG. 23 illustrates an opposite case of FIG. 22, and illustrates a screen example in a state in which a separator 200 is moved to an upper direction of a screen according to a user input, and accordingly the size of an upper window is reduced and the size of the lower window is enlarged.

FIGS. 24, 25, 26, 27, 28, and 29 are diagrams illustrating examples operating a key pad for text input in a multi-window environment according to an embodiment of the present disclosure.

Referring to FIGS. 24, 25, 26, 27, 28, to 29, the present disclosure provides a touch key pad (e.g., a floating key pad) 500 having a different form from a normal touch key pad for efficiently operating a multi-window environment. That is, according to embodiments of the present disclosure, a touch key pad operated in a normal mode providing a screen of one application as a full screen, and a floating key pad 500 operated in a multi-window mode providing a screen of a plurality of applications as an individual screen through screen split may be differentially provided. In the present disclosure, the floating key pad 500 is not fixed to a pre-defined region like a normal touch key pad, but may be freely moved around in a screen of the touch device in response to the user input. The floating key pad of the present disclosure may be in the form of a pop-up when a text input is requested (e.g., a user input selecting a text input window of an application of the specific window) from an application of the specific window according to user selection from among applications of a plurality of windows separated as a multi-window in the multi-window environment.

Referring to FIGS. 24, 25, 26, 27, 28 and 29, FIG. 24 illustrates a screen example of a touch device in a state in which the touch device displays a screen of different applications through each window of two split execution regions.

Figure 25:
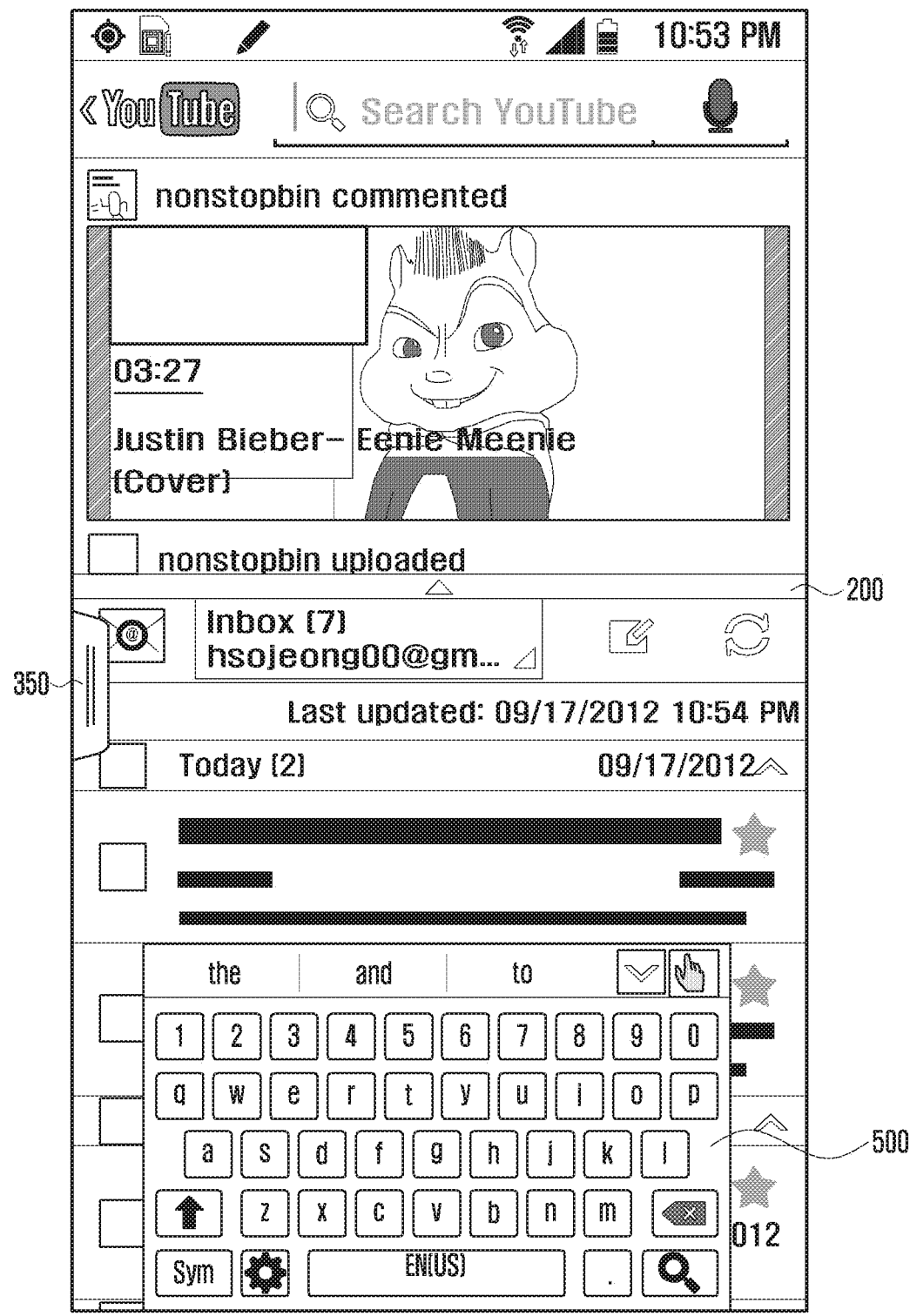

The user may display a floating key pad at a predetermined region (e.g., a pre-defined region or a previously executed region) according to a user input referring to FIG. 25 in a state in which screens of a plurality of applications according to a multi-window environment are simultaneously displayed. For example, the user may input a menu operation of the touch device, function key selection for executing the floating key pad 500, or a touch event (e.g., a gesture having a specific pattern such as figures and characters) set to execute the floating key pad 500. More particularly, in the present disclosure, when a text input window in which a text input is possible is selected on an application screen executed on a window of each split execution region, the floating key pad 500 may be automatically executed and be provided on the screen.

Referring to FIG. 25, the touch device activates a floating key pad 500 at one region of a screen operated as the multi-window. For example, a location provided when the floating key pad 500 is activated may be provided in a form that a bottom end of the floating key pad 500 adheres to a lower frame. In the present disclosure, the floating key pad 500 has a separate layer and may be provided in an overlay form on screens according to a multi-window.

Figure 26:
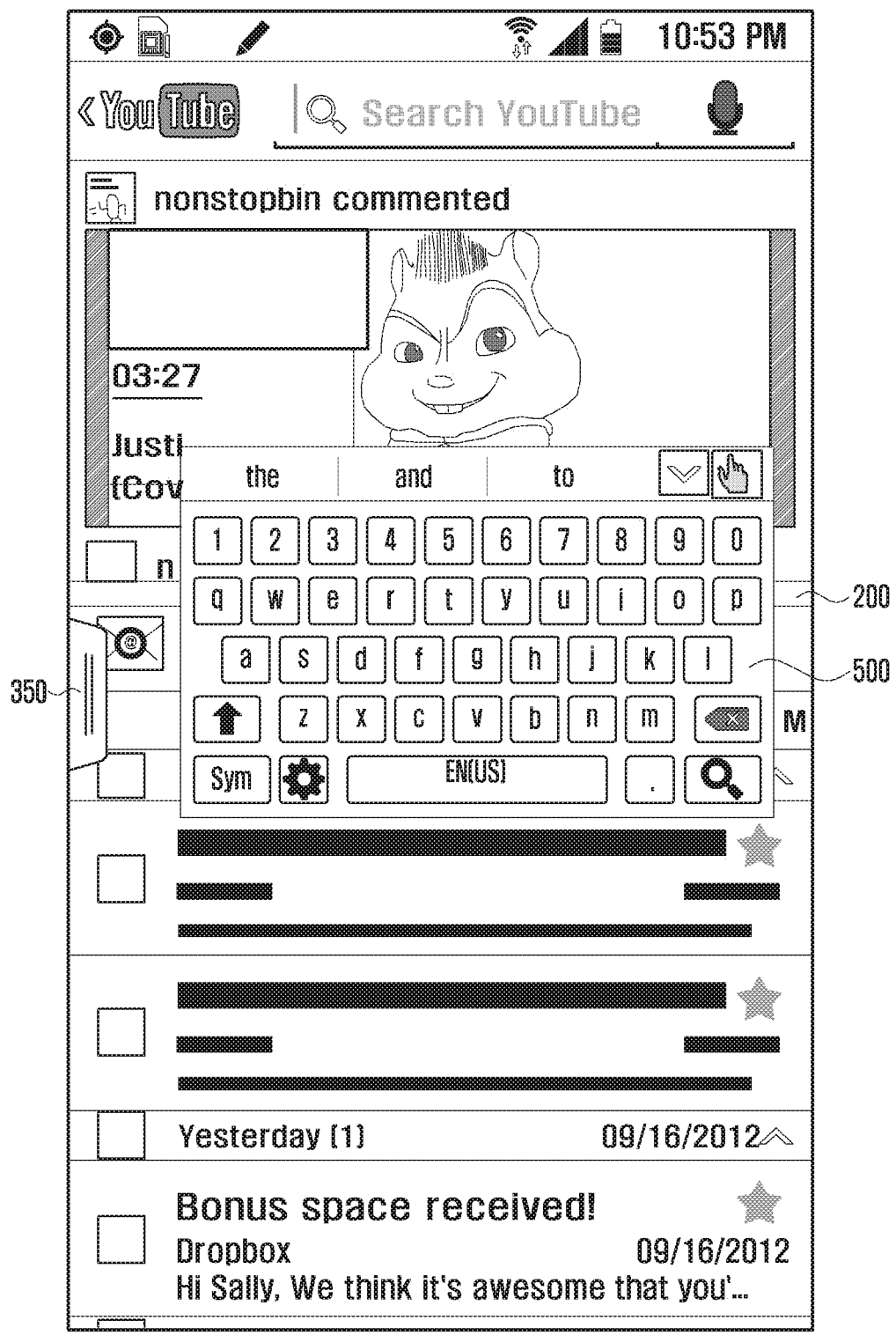

The user may input a movement event (e.g., a touch & drag) moving the floating key pad 500 to another region on the screen as illustrated in FIG. 26 in a state in which the floating key pad 500 is displayed on the screen. For example, the user may input a movement event which touches and drags a part of the floating key pad 500 to another region (e.g., upward) of the screen. Accordingly, the touch device may provide UI or GUI separating the floating key pad 500 from a lower frame according to the movement event and moving the floating key pad 500 with a drag of the user in response to the drag of the user.

Figure 27:
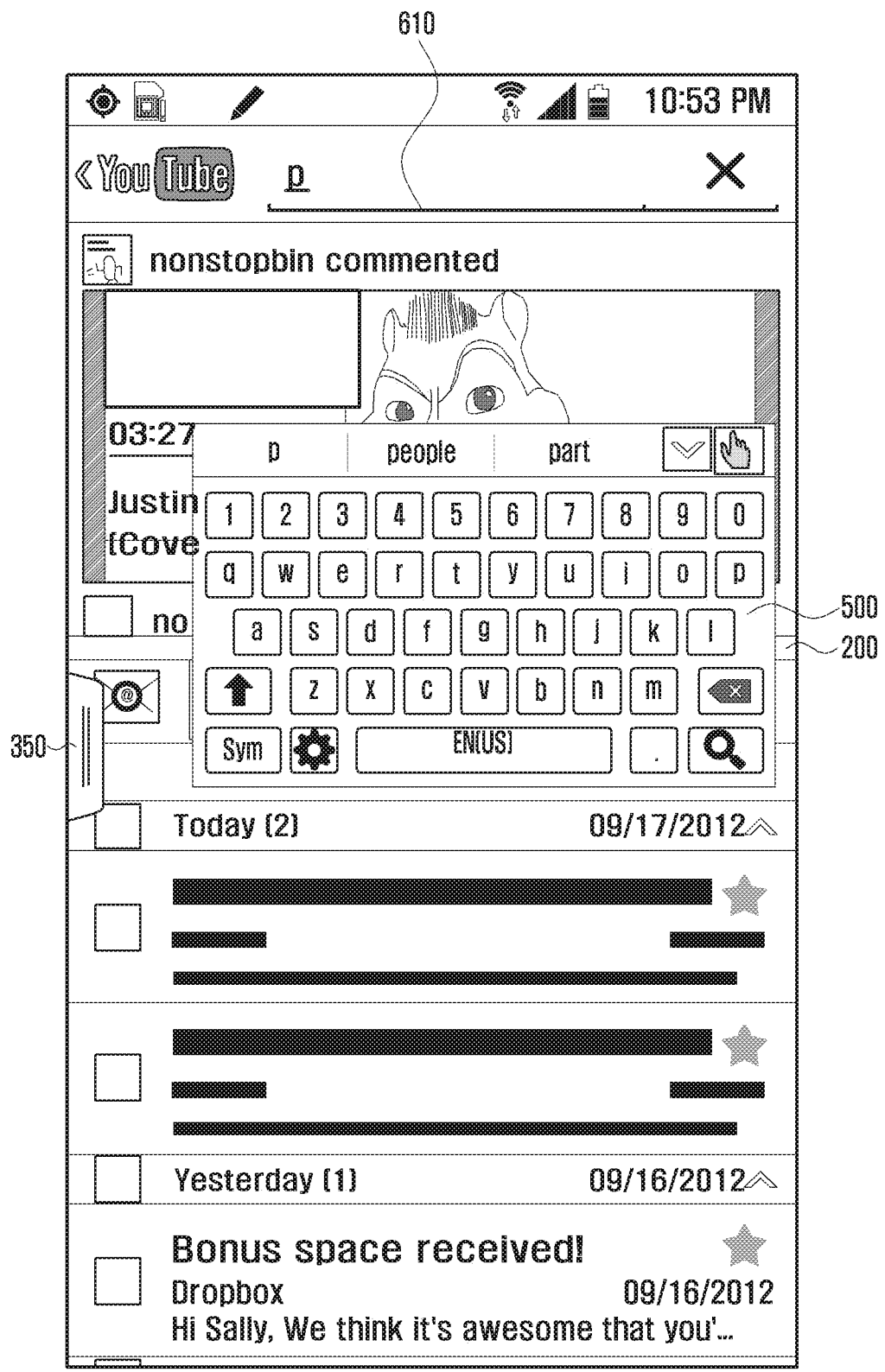

The user may move the floating key pad 500 to a desired location and release the input movement event as shown in FIG. 27. That is, the user may release a drag input for moving the floating key pad 500. Accordingly, the touch device may arrange and display the floating key pad 500 in a location in which the drag input is released.

According to embodiments of the present disclosure, the user input may be achieved in both of respective windows of split execution regions and the floating key pad 500 in a state in which the floating key pad 500 is provided. In this case, a user input by the floating key pad 500 is received in a region that the floating key pad 500 occupies, and a user input for a corresponding window may be received in a remaining region.

Referring to FIG. 27, the user may perform a text input using the floating key pad 500 in a state in which the floating key pad 500 is displayed. For example, it is assumed that the user inputs a text on a screen of an application executing on the upper window. In this case, the user selects the upper window (i.e., selects any one region (e.g., a text input window) in which a text input is possible from an application screen of an upper window), and selects and inputs a desired character button on the floating key pad 500.

Figure 28:
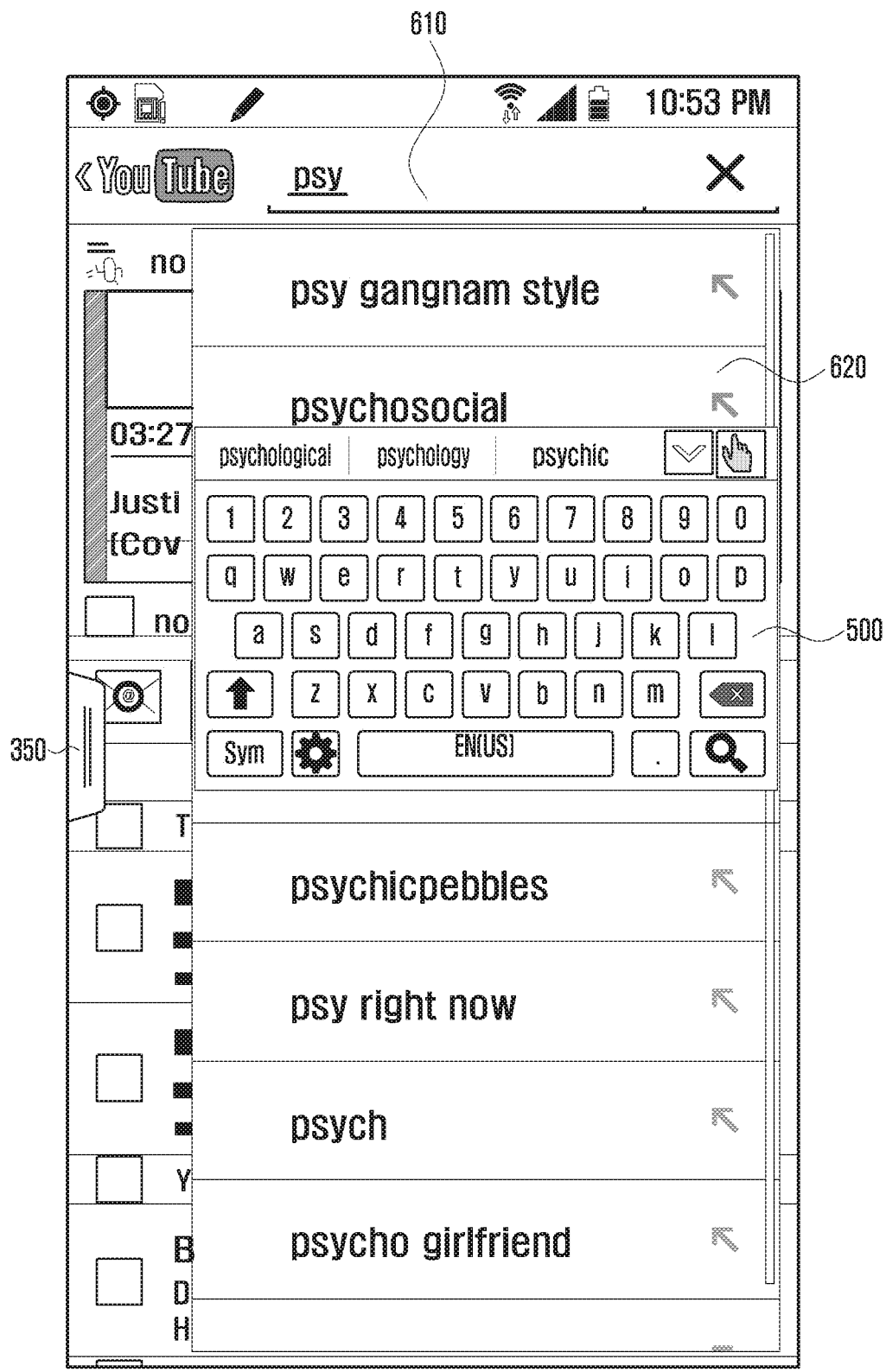

Referring to FIGS. 27 and 28, the user selects a text input window 610 on a screen of an application executing through the upper window to implement a state in which the text input is possible. Further, the user may sequentially input respective buttons to which characters p, s, and y are allocated to input "psy" using the floating key pad 500.

Accordingly, the touch device may input and display a corresponding character on the text input window 610 in response to the user input as illustrated in FIGS. 27 and 28.

Referring to FIG. 28, the touch device may provide a result for a text (e.g., "psy") input to the text input window 610 of an application executing on the upper window to the floating key pad 500 in the form of an underlay as illustrated in FIG. 28. For example, as an example of FIG. 28, a text input in to the text input window 610 may be provided through a recommendation region 620 of a new layout recommending a searched result corresponding to the text input in to the text input window 610 while maintaining a current state. The recommendation region 620 may be provided in such a way that overlies a screen of an application and the floating key pad 500 overlies the recommendation region 620. That is, the floating key pad 500 may be disposed at the uppermost position and may maintain a current state.

The text input to the text input window 610 may be input to the same layer as an application screen and may be directly provided thereon. For example, in a case of a text input window in to which receiver information is input, like a mail application executed in the lower window, and unlike the example of FIG. 28, only an input result may be displayed through a text input window of an application screen without a separate new layer.

Figure 29:
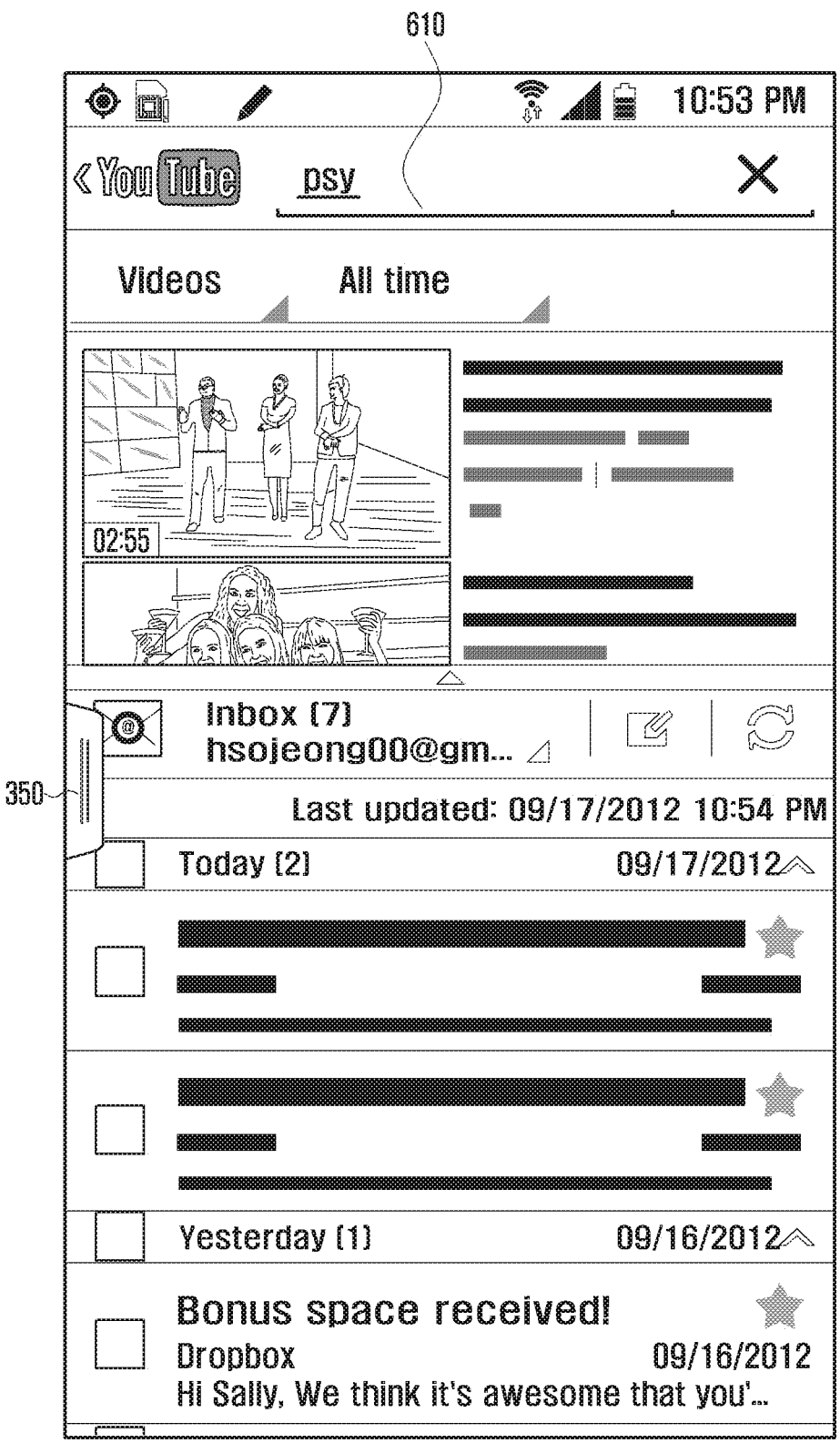

Referring to FIG. 28, the user may select any one recommended result in a state in which a recommendation region 620 is displayed on the floating key pad 500 as an underlay, or operate (i.e., command) search execution for a text input to the text input window 610. A corresponding result screen is illustrated in FIG. 29. That is, a screen of a touch device illustrated in FIG. 28 is switched as illustrated in FIG. 29 according to a user input.

Referring to FIG. 29, after a text shown in text input window 610 is input through the floating key pad 500 according to user input, when function execution for a corresponding application (e.g., a search execution, a mail transmission execution, a memo storage execution, a message transmission execution, or the like) is input, the floating key pad 500 is removed from the screen, and a result for the execution may be provided from a corresponding window of an application executing the function. For example, referring to FIGS. 28 and 29, a search result for "psy" input from an application of an upper window may be provided through the upper window.

Figure 30:
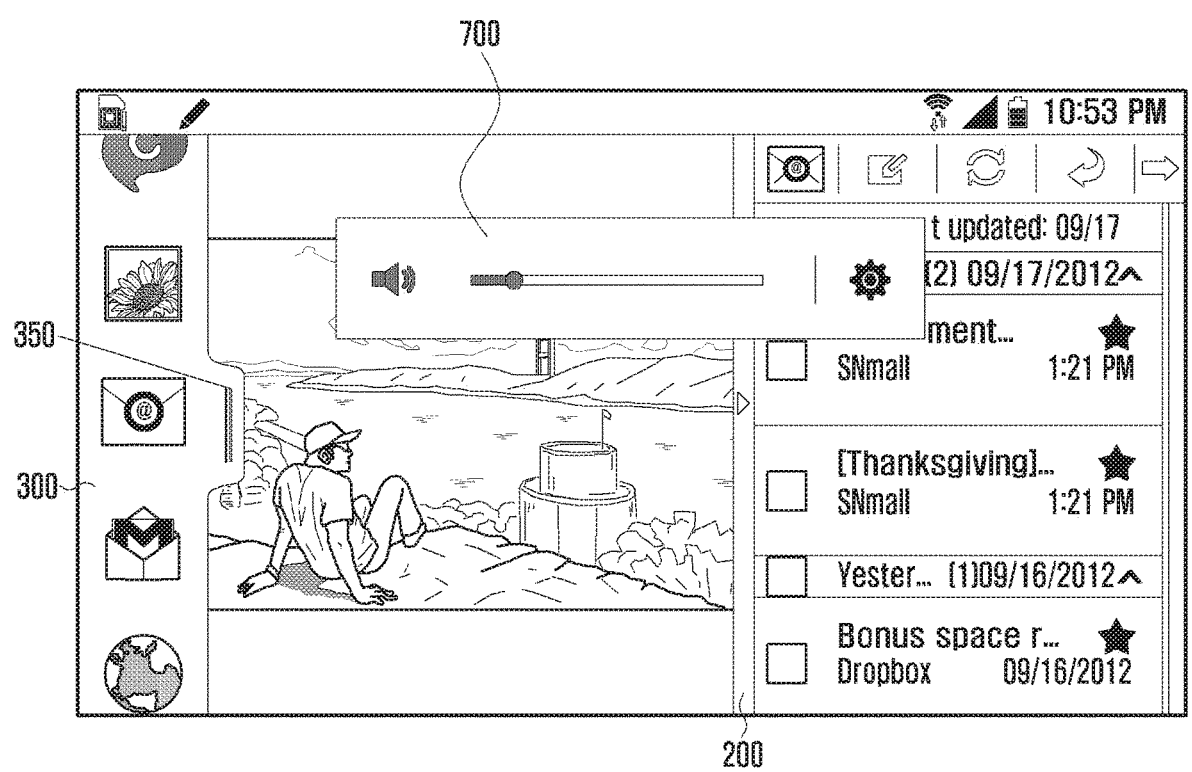
FIG. 30 is a diagram illustrating an example of operating a plurality of applications in a multi-window environment according to an disclosure embodiment of the present disclosure.

FIG. 30 is a diagram illustrating an example of operating a plurality of applications in a multi-window environment according to an embodiment of the present disclosure.

Referring to FIG. 30, FIG. 30 illustrates a screen example when specific setting for respective windows is changed according to the user input in a state in which the touch device displays screens of different applications through respective windows of two split execution regions.

According to embodiments of the present disclosure, a function may be independently set in every split window. That is, a function suitable for a characteristic of an execution application of a window selected by the user from among windows of split execution regions may be changed. For example, the user may select a left window from among windows of split execution regions, and operate a pre-set function (e.g., operate a function key provided to control a volume). Accordingly, the touch device may separate a characteristic of an application executing through the left window. Further, the touch device may display a volume setting item 700 according to a characteristic of a separated application (e.g., a media playing capability, like a video playing capability), and may feedback a setting value changed according to the user input. In this case, when the user defines a setting of screen brightness with respect to the media characteristic, a screen brightness setting item (not shown) instead of the volume setting item 700 may be provided on the screen, and a feedback where brightness of the screen is changed according to the user input may be provided. Further, the setting for an application executing on the right window may be changed in accordance with the foregoing scheme.

As described above, when a function setting is changed according to a user input on a specific window, an independent setting may be achieved for each window. For example, when a volume or screen brightness is set on the left window, a setting value may be reflected and displayed only for the left window.

FIGS. 31, 32, 33, and 34 are diagrams illustrating examples of an operation screen providing information for a plurality of applications executed according to a multi-window environment in a touch device according to an embodiment of the present disclosure.

Figure 31:
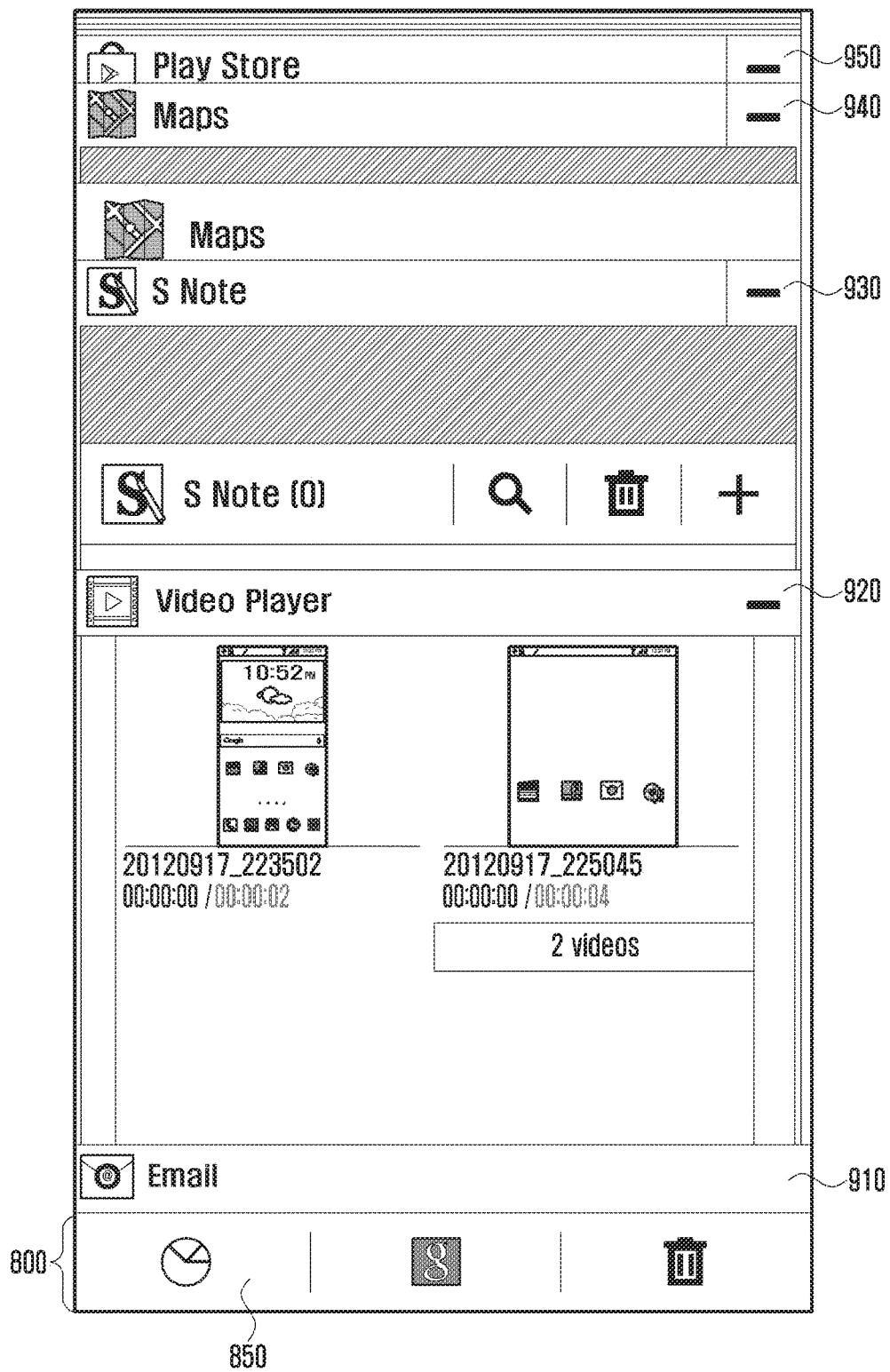
FIGS. 31, 32, 33, and 34 are diagrams illustrating examples of an operation screen providing information with respect to a plurality of applications executed according to a multi-window environment in a touch device according to an embodiment of the present disclosure.

Referring to FIGS. 31, 32, 33, and 34, FIG. 31 illustrates a screen example of a touch device when the touch device displays a list for a plurality of application executed according to a multi-window environment. Referring to FIG. 31, a list of applications executed in the multi-window environment by the user may be provided through a full screen according to user selection. The user may input a menu operation of the touch device, function key selection for executing the list, or a touch event (e.g., a gesture having a specific pattern such figures or characters) set to execute the list in a state in which a function by multi window is operating or the screen is converted into an idle screen. Accordingly, as illustrated in FIG. 31, the touch device may display a list for applications currently executed (including background execution) through UI or GUI set as FIG. 31.

Referring to FIG. 31, applications which are executed by the user in the multi-window environment and currently maintain the execution may be provided in a specific arrangement format. For example, the applications may be arranged and provided in an execution order or a random order. FIG. 31 illustrates a list including an E-mail application 910, a Video Player application 920, a Note application 930, a Map application 940, and a Play Store application 950.

Figure 32:
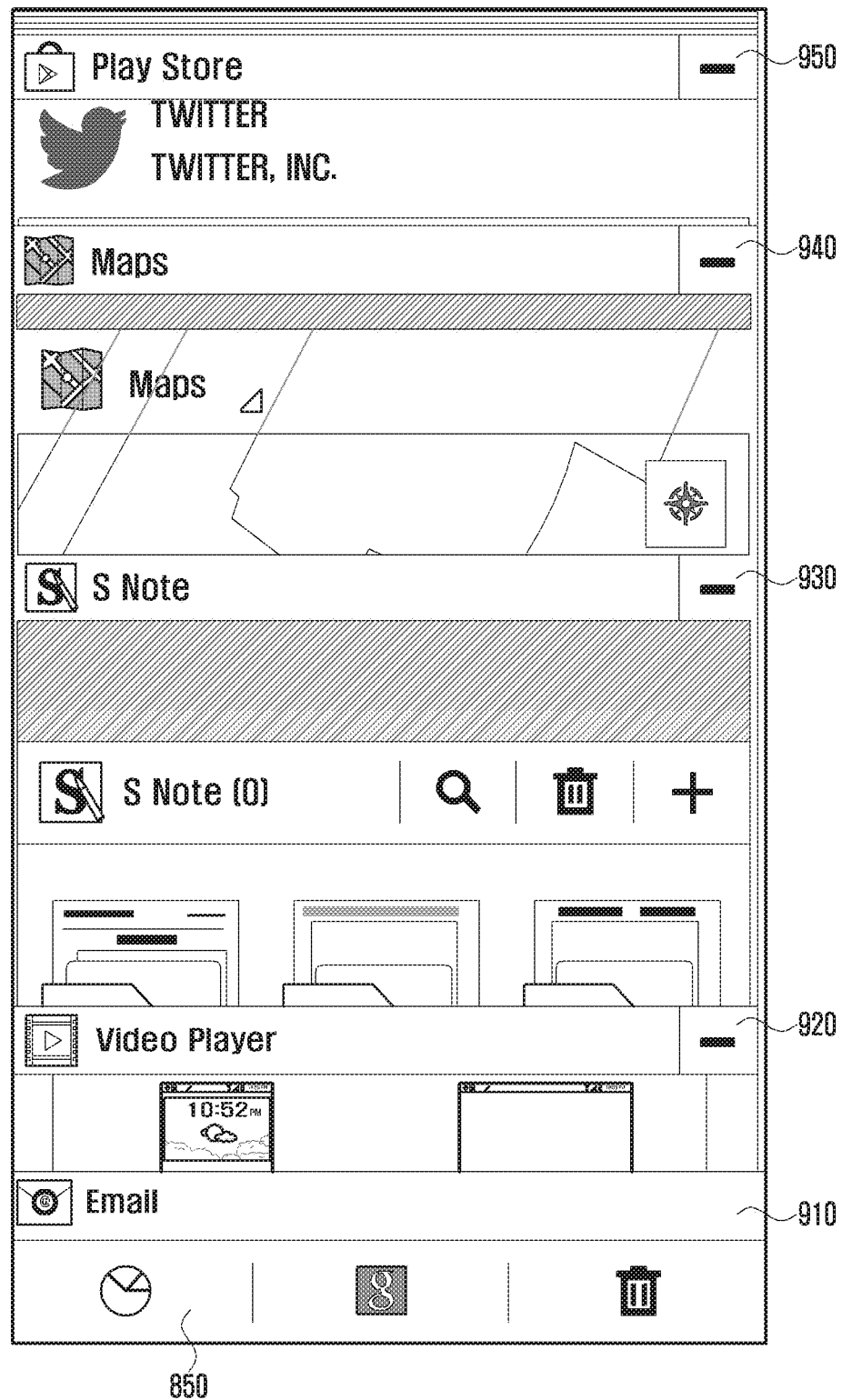
Figure 33:
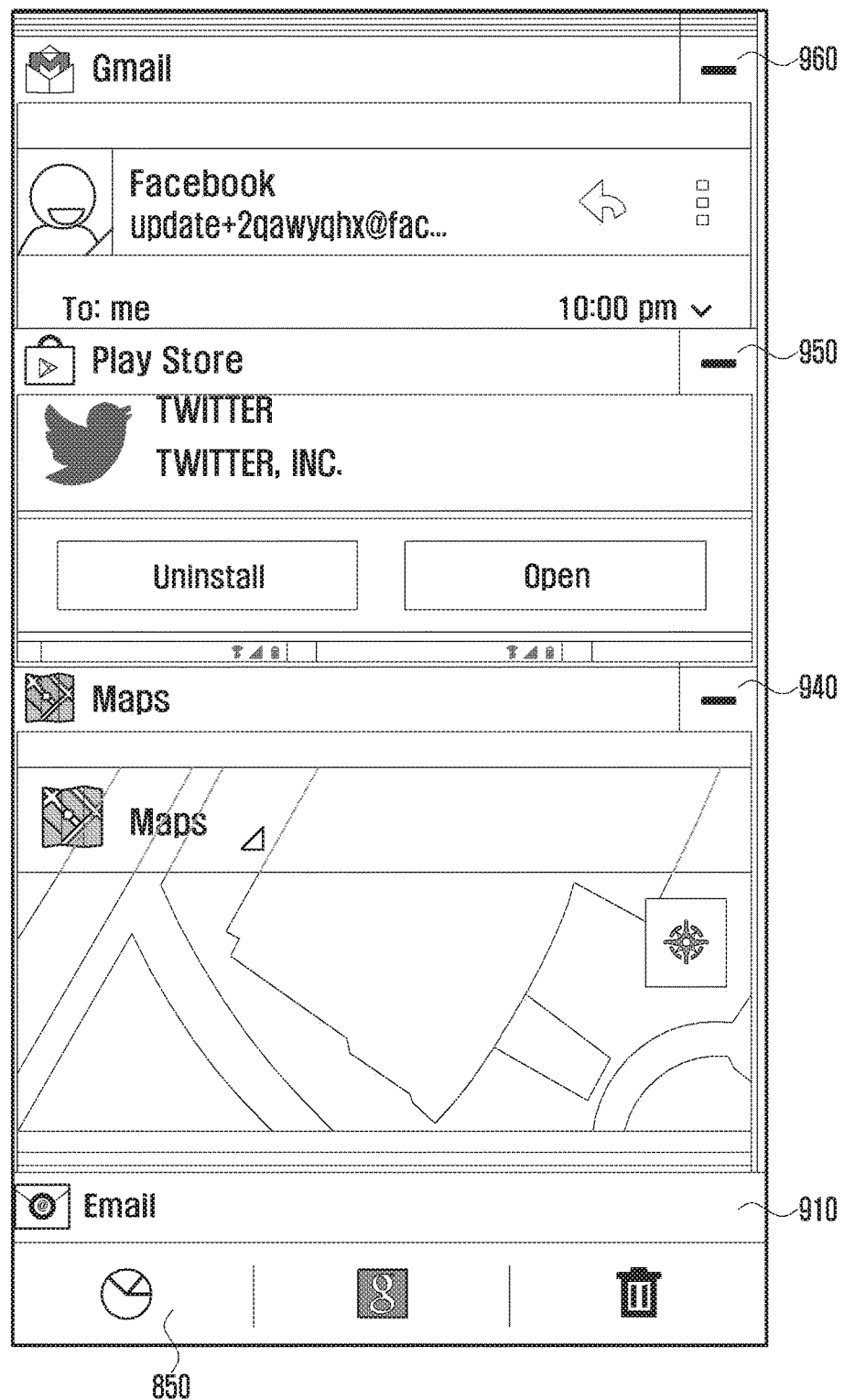

Referring to FIGS. 32 and 33, although not displayed on an initial list screen of FIG. 31, remaining applications (e.g., Gmail application 960, Wi-Fi application 970, and Phone application 980) hidden according to scroll (or navigation) control of the user may be spread and displayed. That is, the list illustrated in FIG. 31 includes different applications which are not displayed through the screen but are hidden. The number of applications included in the initial list may be suitably set in consideration of intuition of the user according to the size of a screen of the touch device. When the number of executing applications is greater than the preset number, excessive applications may be hidden as illustrated in examples of FIGS. 31 to 34. Information for the applications of the list may be provided in such a manner that an information display region of an application (e.g., Video Player application 920) disposed at a lower side among the applications is mainly allocated and the information display region becomes gradually reduced in the upward direction. Accordingly, the uppermost application (e.g., Play Store application 950) may display only a state bar capable of discriminating a corresponding application.

Further, as shown in FIG. 31, an application (e.g., E-mail application 910) disposed at a lowermost region to display only a state bar may correspond to at least one application which is most recently executed by user or is displayed on a screen just before execution of a list. In this manner, the application disposed at the lowermost region may be fixed and provided at a corresponding region regardless of scroll control of the user, and fixed arrangement may not be achieved according to user setting.

Further, a list screen for the execution applications of the present disclosure may include a command region 800 for supporting a variety of command types (e.g., an application scroll, a termination of application execution, an application search, or the like) for the execution applications in the list. More particularly, the list screen may include a scroll item 850 for controlling a scroll (or a spread) for the applications in the list. That is, the user may scroll the applications in the list through a user input using the scroll item 850. The touch device may provide UI or GUI where information of applications overlapped according to a user input scheme for the scroll item 850 is spread. In this case, when a user input scheme is repeated once to be input, the touch device may repeatedly control (e.g., spread) one scroll in response to a corresponding input. When the user input scheme maintains an input (e.g., a touched) state of the scroll item 850, the touch device may continuously control automatic scroll while the user input is maintained.

Figure 34:
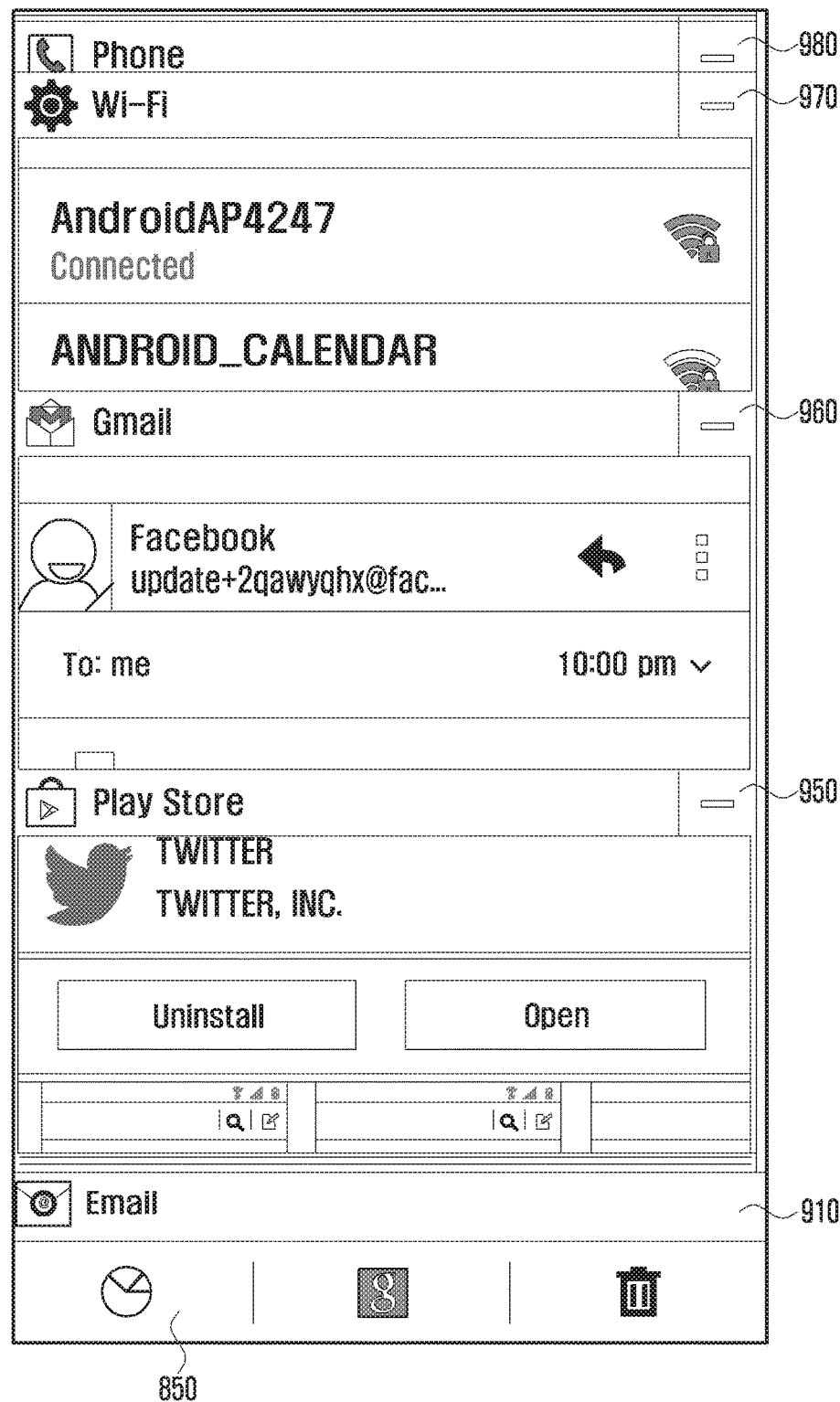

The user may select (touch) the scroll item 850 to maintain the input in a state in which the list is displayed as illustrated in FIG. 31. Accordingly, when a user input for the scroll item 850 is detected, the touch device displays a screen where information of applications spread from up to down as illustrated in FIGS. 32, 33, and 34. That is, the list screen of the touch device illustrated in FIG. 31 is switched as shown in FIGS. 32, 33, and 34 according to the user input.

Referring to FIGS. 32, 33, and 34, UI or GUI may be provided in such a manner that a Video Play application 920 is pulled downward in response to the user input using the scroll item 850 and disappears from the screen while information of other upper applications disposed in the upper side is gradually spread and is sequentially pulled downward. Further, when the list is scrolled according to scroll control according to the user input, referring to FIGS. 33 and 34, other hidden applications (e.g., a Gmail application 960 (FIG. 33), a Wi-Fi application 970 [FIG. 34], a Phone application 980 [FIG. 34], or the like) may be sequentially displayed on the screen. In this case, as illustrated in FIGS. 32, 33, and 34, an E-mail application 910 may be fixed at a corresponding location to be continuously displayed.

As illustrated in FIGS. 31, 33, and 34, the user may select an item of a specific application in a state in which the list is displayed, or during scroll control. Accordingly, the touch device may display the selected application as a full screen. Referring to FIGS. 31, 33, and 34, when the user input is achieved by the scroll item 850 until scroll for all applications included in the list is achieved, that is, when all the applications in the list is spread and pulled downward, the touch device may automatically display a recently executed application (i.e., an application [e.g., E-mail application 910] fixed and arranged at the lowermost side) as a full screen.

Figure 35:
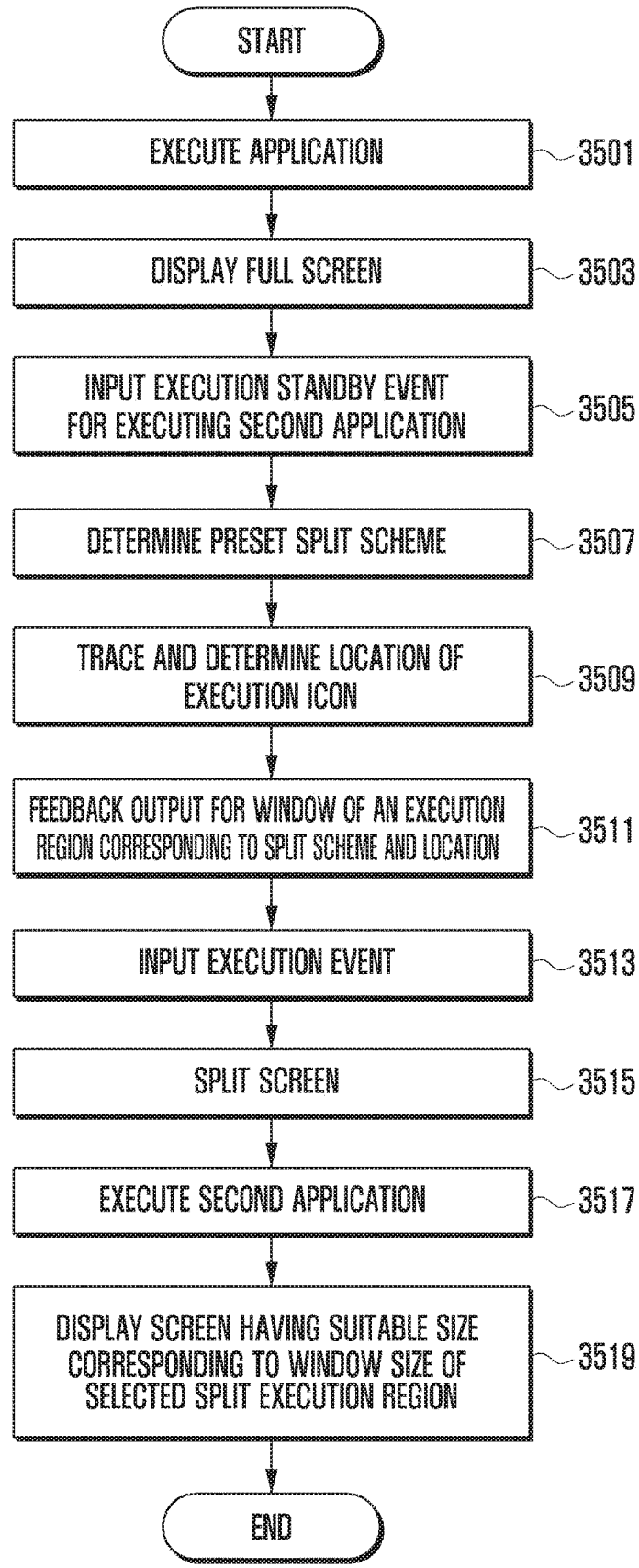
FIG. 35 is a flowchart illustrating a method of executing an additional application by switching a multi-window environment in a touch device according to an embodiment of the present disclosure.

FIG. 35 is a flowchart illustrating a method of operating a multi-window environment in a touch device according to an embodiment of the present disclosure. More particularly, FIG. 35 illustrates an example of switching to the multi-window environment during an operation of one window.

Referring to FIG. 35, a controller 170 executes an application (hereinafter, referred to as a "first application") corresponding to user selection at operation 3501, and controls screen display for the executing first application at operation 3503. In this case, the controller 170 controls display of a full screen of the first application through one window.

When receiving an execution standby event input for executing an additional application (e.g., a "second application") in a state in which the first application is executed at operation 3505, and determines a preset multi-window split scheme at operation 3507. In the present disclosure, the execution standby event may refer to an event for additionally executing and displaying another application by a multi-window environment in a state in which the user executes and displays any one application. More particularly, the execution standby event may refer to an event which allows the user to activate (e.g., slide in) the tray 300 on the screen and select an execution icon of an application to be additionally executed from the activated tray 300 to move (e.g., drag) into the screen.

When the execution icon is moved from the tray 300 and enters in the screen, the controller 170 traces and determines a moved location of the execution icon at operation 3509. The controller 170 may confirm a window of a current region after the execution icon is moved through location trace of the execution icon.

The controller 170 controls feedback output for a window of an execution region in which an additional application is able to be executed in response to the determined split scheme and a location of an execution icon at operation 3511. That is, the controller 170 may control feedback output for a specific window of a location in which the execution icon is dragging while the execution icon is move on the full screen according to the drag. For example, the controller 170 may focus and display a window of a location to which the execution icon is moved.

If an execution event of the second application by execution icon is input at operation 3513, the controller 170 splits a screen at operation 3515 and controls execution of the second application at operation 3517. The execution event may be an event dropping the execution icon in one region of the screen. The controller 170 identifies a region (e.g., a region where an execution icon is dragged and dropped [i.e., a drag & drop]) where the execution icon is moved to generate an execution event, splits a full screen for the first application, and determines a region in which the execution event is generated among the split regions as one window (i.e., execution region) for displaying a screen of the second application.

Upon executing the second application, the controller 170 controls to display a screen having a suitable size corresponding to the window size of the split execution region (i.e., an execution region in which the second application is executed) at operation 3519. Here, the controller 170 may display a screen of the first application in a window (e.g., an upper window) of a split execution region as a full screen or a partial screen, and display a screen of the second application in a window (e.g., a lower window) of another split execution region as a full screen or a partial screen. For example, when the first application or the second application is an application having a capability of playing media, like a video, the controller 170 may change into a screen of a suitable size pertinent to a corresponding window size of a split execution region, and display a playing screen in the window as the full screen. When the first application and the second application are an application having a characteristic of a text or a list like Internet, the controller 170 may display as a partial screen in response to a corresponding window size of the split execution region. That is, according to embodiments of the present disclosure, a screen of the first application and a screen of the second application may be independently displayed on a corresponding window by implementing the multi-window environment.

That is, if an input where the execution icon is dropped on a specific window during drag is received, the controller 170 may execute the second application in response to a drop input of the execution icon. In this case, when executing the second application, the controller 170 may split the full screen into windows for displaying screens of the first application and the second application. Further, the controller 170 may display a screen of the second application through the specific window in which the execution icon is dropped, and display a screen of the first application through another split window.

Figure 36:
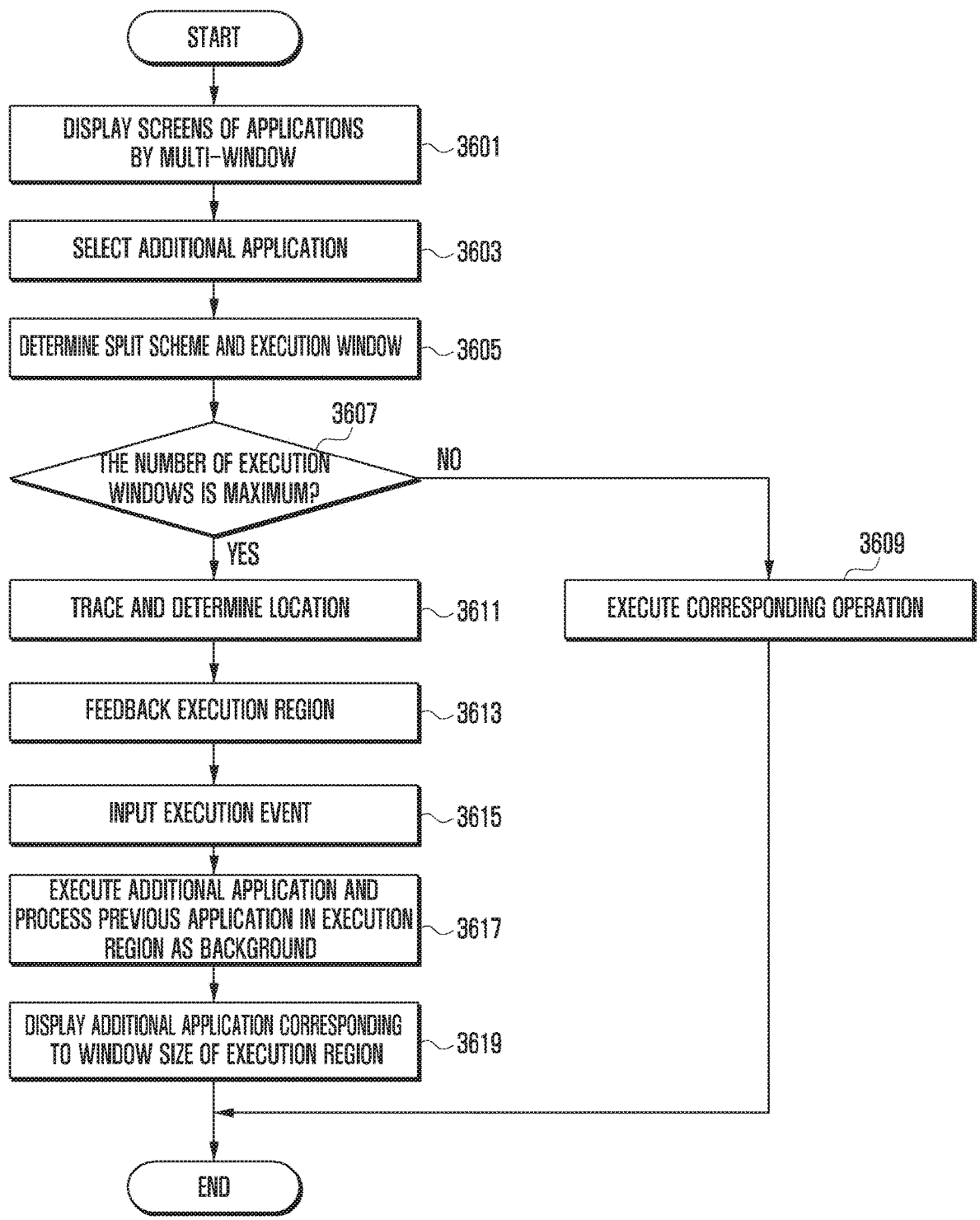
FIG. 36 is a flowchart illustrating a method of executing an additional application in a multi-window environment in a touch device according to an embodiment of the present disclosure.

FIG. 36 is a flowchart illustrating a method of operating a multi-window environment in a touch device according to an embodiment of the present disclosure. In particular, FIG. 36 illustrates an operation example in which an additional application is executed while operating the multi-window.

Referring to FIG. 36, when displaying screens of a plurality of applications by a multi-window at operation 3601, the controller 170 may receive an input for selecting an additional application to additionally execute an application at operation 3603. That is, according to embodiments of the present disclosure, another application may be further executed while independently displaying screens of a plurality of different applications through respective split windows in the multi-window environment.

If an input for selecting an additional application is received in the multi-window environment, the controller 170 determines a split scheme and a currently executed window (e.g., an "execution window") at operation 3605. For example, the controller 170 may confirm how many window split schemes exist in the screen split for multi-window environment through pre-defined split information, and determine how many currently executed windows are split and operated.

The controller 170 compares the number of execution windows with the split information to determine whether the number of execution windows corresponds to a maximum value set to the pre-defined split information at operation 3607. For example, the controller 170 may determine whether the pre-defined split information is 3 and the number of currently executed windows is 3. If the number of execution windows does not correspond to the maximum value set to the split information (NO of operation 3607), the controller 170 controls execution of a corresponding operation at operation 3609.

For example, as described above, the controller 170 may control an additional screen split for executing the additional application, execution of the additional application according thereto, and screen display for a plurality of applications. This may correspond to an operation for controlling execution of the additional application due to screen slit on the full screen as illustrated in an example of FIG. 35.

If the number of execution windows corresponds to the maximum value set to the split information (i.e., YES of operation 3607), the controller 170 traces and determines a location for a user input selecting an execution region for executing the additional application at operation 3611. For example, when the user selects an execution icon of an application to be additionally executed from the tray 300 and moves the selected icon into the screen, the controller 170 may trace and determine a moved location of the execution icon.

The controller 170 feedbacks an execution region in which an additional application is able to be executed in response to the determined location at operation 3613. For example, when the execution icon is moved from the tray 300 and enters in the screen, the controller 170 focuses and displays a window of a location to which the execution icon is moved.

If an execution event for the additional application is input at operation 3615, the controller 170 executes the additional application and controls processing of a previous application executed in a corresponding execution region as a background at operation 3617.

For example, when executing the additional application in response to the user input, the controller 170 may process an application previously executed through a window selected to execute the additional application as the background, and may display the screen of additional application which is requested to execute through a corresponding window. That is, the controller 170 may process the previous application allocated to a corresponding window as a background to continuously execute the application, and may just replace a screen displayed on a corresponding window.

Upon executing the additional application, the controller 170 may control a screen display corresponding to a window size of an execution region in which the additional application is executed at operation 3619. For example, the controller 170 may display a screen of the additional application in a window of a corresponding execution region as a full screen or a partial screen.

Here, when the additional application is an application having a capability of playing media, like a video, the controller 170 changes into a screen having a suitable size corresponding to a window size of a corresponding execution region, and may display a playing screen in the window as a full screen. When the additional application is an application having a capability of processing a text or a list, e.g., an Internet application, the controller 170 may display a partial screen corresponding to a window size of the corresponding execution region.

The foregoing various embodiments of the present disclosure may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present disclosure or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of an embodiment of the present disclosure, and vice versa.

Accordingly, embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

As described above, according to the method and the apparatus for providing a multi-window in a touch device of the present disclosure, the user may simultaneously use a plurality of applications as a determined split screen or a free style in a simple method. For example, in order to split the screen to use a multi-window in a state in which one application is executed as a full screen, the user drags an additional application from the tray to drag & drop the application to a determined location or a free location, thereby simultaneously operating a plurality of applications.

Further, according to the present disclosure, the user may easily arrange and confirm a plurality of application from one screen through a multi-window, and freely change each window according to the multi-window to a desired layout, thereby solving burden and trouble with respect to an efficient configuration of a screen and operations of a plurality of applications.

According to the present disclosure, large amounts of information and various user experiences may be provided to the user through the multi-window environment. Further, according to the present disclosure, the user may efficiently and simultaneously perform an operation with respect to various applications by a multi-window environment on a small screen of the touch device. For example, the user may simultaneously perform other operations such as creation of messages and mail while viewing and listening to a video on one screen of the touch device. Accordingly, according to the present disclosure, an optimal environment capable of supporting a multi-window environment in the touch device is implemented so that convenience for the user can be improved, and usability, convenience, and competitive forces of the touch device can be improved. The present disclosure may simply implement various types of touch devices and various corresponding devices.

It will be appreciated from the following description that, in certain embodiments of the invention, features concerning the graphic design of user interfaces are combined with interaction steps or means to achieve a technical effect.

It will be appreciated from the following description that, in certain embodiments of the invention, graphic features concerning technical information (e.g. internal machine states) are utilised to achieve a technical effect.

Certain embodiments aim to achieve the technical effect of enhancing the precision of an input device.

Certain embodiments aim to achieve the technical effect of lowering a burden (e.g. a cognitive, operative, operational, operating, or manipulative burden) of a user when performing certain computer or device interactions.

Certain embodiments aim to achieve the technical effect of providing a more efficient man-machine (user-machine) interface.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A portable electronic device comprising:
a display; and
a processor configured to control to:
  display a first application screen of a first application in a full screen window on the display;
  while the first application screen of the first application is displayed in the full screen window, receive a first input for displaying an icon display area, the icon display area including a plurality of execution icons that each correspond to a respective application;
  based on receiving the first input for displaying the icon display area, display the icon display area over the first application screen of the first application displayed in the full screen window;
  while the icon display area is displayed over the first application screen of the first application displayed in the full screen window, receive a first part of a second input that comprises a selection of an icon corresponding to a second application from the icon display area;
  based on receiving a second part of the second input that comprises dragging the selected icon over the first application screen of the first application displayed in the full screen window and before receiving a third part of the second input that comprises releasing the selected icon at a location on the display, display a preview image of a multi-window that provides feedback indicating which of two respective sides of the display the first application screen of the first application and a second application screen of the second application are to be displayed within the multi-window, wherein the preview image of the multi-window provides the feedback without displaying content of the second application screen of the second application; and
  in response to the receiving of the third part of the second input that comprises the releasing of the selected icon at the location on the display, concurrently display the first application screen of the first application in a first window of the multi-window on a first side of the display and the second application screen of the second application in a second window of the multi-window on a second side of the display,
wherein the second input is a continuous input sequentially including the first, second, and third parts of the second input, and
wherein, while the preview image of the multi-window is displayed, the icon display area is displayed over a portion of the preview image corresponding to at least a portion of both windows of the multi-window.

2. The portable electronic device of claim 1, wherein the processor is configured to:
display the icon display area via a slide in effect over the first application screen of the first application displayed in the full screen window.

3. The portable electronic device of claim 1, wherein the processor is configured to display the preview image of the multi-window by:
displaying a visual feedback indicating that the second application screen of the second application is to be displayed in the second window of the multi-window on the second side of the display.

4. The portable electronic device of claim 1,
wherein the processor is configured to confirm a portion of the display corresponding to one of the first window and the second window of the multi-window where the selected icon is currently located through a location trace of the selected icon, and
wherein the second window of the multi-window in which the second application screen of the second application is displayed is located in a portion of the display where the selected icon is released during the third part of the second input.

5. The portable electronic device of claim 1,
wherein the processor is configured to discontinue the displaying of the icon display area, and concurrently display the first application screen of the first application in the first window of the multi-window on the first side of the display and the second application screen of the second application in the second window of the multi-window on the second side of the display in place of the first application screen of the first application displayed in the full screen window, in response to the selected icon being released during the third part of the second input while the preview image of a multi-window is displayed, and
wherein the multi-window comprises first window and the second window that splits the display and the first application screen of the first application is displayed as an entire area in the first window of the multi-window and the second application screen of the second application is displayed as an entire area in the second window of the multi-window.

6. The portable electronic device of claim 1, wherein the processor is configured to:
blank a region to which an icon is allocated in the icon display area when the selected icon is dragged away from the icon display area during the second part of the second input.

7. The portable electronic device of claim 1, wherein the processor is configured to:
discontinue the displaying of the icon display area after the selected icon is dragged away from the icon display area during the second part of the second input.

8. The portable electronic device of claim 7, wherein the processor, to discontinue the displaying of the icon display area, is configured to:
in response to the receiving of the third part of the second input, discontinue the displaying of the icon display area and concurrently display the first application screen of the first application in the first window of the multi-window on the first side of the display and the second application screen of the second application in the second window of the multi-window on the second side of the display.

9. The portable electronic device of claim 1, wherein the first application screen of the first application is displayed corresponding to a size of the first window of the multi-window and the second application screen of the second application is displayed corresponding to a size of the second window of the multi-window.

10. The portable electronic device of claim 9,
wherein the first window of the multi-window and the second window of the multi-window are separated by a separator, and
wherein the sizes of respective windows of the multi-window are changed according to a movement of the separator.

11. The portable electronic device of claim 10, wherein the processor is configured to:
respectively scale and display execution screens of the first and second applications corresponding to the sizes of respective first and second windows of the multi-window.

12. The portable electronic device of claim 1, wherein the first side of the display is opposite the second side of the display.

13. The portable electronic device of claim 1, wherein the processor is configured to:
move the icon display area to another region of the display according to a user input.

14. The portable electronic device of claim 1, wherein the processor is configured to:
receive an input for executing a third application;
display a third application screen of the third application within one of the first and second windows of the multi-window selected to display the third application screen; and
process in a background an application previously displaying an execution screen within the selected window.

15. The portable electronic device of claim 14, wherein the processor is configured to:
in response to receiving the input for executing the third application, comparing a number of currently displayed execution screens with a maximum number of displayable execution screens;
determining whether the maximum number of displayable execution screens is currently displayed; and
processing in the background the application previously displaying the execution screen within the selected window if the maximum number of displayable execution screens is currently displayed.

16. The portable electronic device of claim 1, wherein the feedback, indicating which of the two respective sides of the display the first application screen of the first application and the second application screen of the second application are to be displayed within the multi-window, is displayed across an entire length of a first dimension the display, and across less than an entire length of a second dimension the display.

17. A method of executing applications performed by a portable electronic device comprising a display, the method comprising:
displaying a first application screen of a first application in a full screen window on the display;
while the first application screen of the first application is displayed in the full screen window, receiving a first input for displaying an icon display area, the icon display area including a plurality of execution icons that each correspond to a respective application;
based on receiving the first input for displaying the icon display area, displaying the icon display area over the first application screen of the first application displayed in the full screen window;
while the icon display area is displayed over the first application screen of the first application displayed in the full screen window, receiving a first part of a second input that comprises a selection of an icon corresponding to a second application from the icon display area;
based on receiving a second part of the second input that comprises dragging the selected icon over the first application screen of the first application displayed in the full screen window and before receiving a third part of the second input that comprises releasing the selected icon at a location on the display, displaying a preview image of a multi-window that provides feedback indicating which of two respective sides of the display the first application screen of the first application and a second application screen of the second application are to be displayed within the multi-window, wherein the preview image of the multi-window provides the feedback without displaying content of the second application screen of the second application; and in response to the receiving of the third part of the second input that comprises the releasing of the selected icon at the location on the display, concurrently displaying the first application screen of the first application in a first window of the multi-window on a first side of the display and the second application screen of the second application in a second window of the multi-window on a second side of the display, wherein the second input is a continuous input sequentially including the first, second, and third parts of the second input, and wherein, while the preview image of the multi-window is displayed, the icon display area is displayed over a portion of the preview image corresponding to at least a portion of both windows of the multi-window.

18. The method of claim 17, wherein the displaying the preview image of the multi-window by:

displaying a visual feedback indicating that the second application screen of the second application is to be displayed in the second window of the multi-window on the second side of the display.

19. The method of claim 17, further comprising:

discontinuing the displaying of the icon display area, and concurrently displaying the first application screen of the first application in the first window of the multi-window on the first side of the display and the second application screen of the second application in the second window of the multi-window on the second side of the display in place of the first application screen of the first application displayed in the full screen window, in response to the selected icon being released during the third part of the second input while the preview image of a multi-window is displayed, wherein the multi-window comprises first window and the second window that splits the display and the first application screen of the first application is displayed as an entire area in the first window of the multi-window and the second application screen of the second application is displayed as an entire area in the second window of the multi-window.

20. The method of claim 17, further comprising:

blanking a region to which an icon is allocated in the icon display area when the selected icon is dragged away from the icon display area during the second part of the second input.

21. The method of claim 17, further comprising:

discontinuing the displaying of the icon display area after the selected icon is dragged away from the icon display area during the second part of the second input.

22. The method of claim 17, wherein the feedback, indicating which of the two respective sides of the display the first application screen of the first application and the second application screen of the second application are to be displayed within the multi-window, is displayed across an entire length of a first dimension the display, and across less than an entire length of a second dimension the display.

* * * * *